US011300166B2

(12) United States Patent
Dohi et al.

(10) Patent No.: US 11,300,166 B2
(45) Date of Patent: Apr. 12, 2022

(54) REVERSE INPUT BLOCKING CLUTCH

(71) Applicant: NSK LTD., Tokyo (JP)

(72) Inventors: Nagao Dohi, Kanagawa (JP); Yuya Daikoku, Kanagawa (JP); Tomoyuki Miyazaki, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/419,848

(22) PCT Filed: Sep. 23, 2020

(86) PCT No.: PCT/JP2020/035774
§ 371 (c)(1),
(2) Date: Jun. 30, 2021

(87) PCT Pub. No.: WO2021/054479
PCT Pub. Date: Mar. 25, 2021

(65) Prior Publication Data
US 2022/0042555 A1 Feb. 10, 2022

(30) Foreign Application Priority Data

Sep. 20, 2019 (JP) .............................. JP2019-171016
Dec. 16, 2019 (JP) .............................. JP2019-226114
Mar. 27, 2020 (JP) .............................. JP2020-058558

(51) Int. Cl.
*F16D 41/08* (2006.01)
*F16D 41/069* (2006.01)
(Continued)

(52) U.S. Cl.
CPC ......... *F16D 41/084* (2013.01); *F16D 41/069* (2013.01); *F16D 41/10* (2013.01);
(Continued)

(58) Field of Classification Search
CPC ...... F16D 41/069; F16D 41/08; F16D 41/084; F16D 41/10; F16D 43/02; F16D 43/211;
(Continued)

(56) References Cited

U.S. PATENT DOCUMENTS 1,617,745 A * 2/1927 Coisinard ............... F16D 59/00
192/223.3
2,031,186 A 2/1936 Still
(Continued)

FOREIGN PATENT DOCUMENTS

EP          3 663 601 A1     6/2020
WO      2019/026794 A1     2/2019

OTHER PUBLICATIONS

International Search Report of PCT/JP2020/035774 dated Dec. 1, 2020 [PCT/ISA/210].

Primary Examiner — Richard M Lorence
(74) Attorney, Agent, or Firm — Sughrue Mion, PLLC

(57) ABSTRACT

A reverse input blocking clutch has: a pressed member having a pressed surface; an input member having an input-side engaging portion; an output member having an output-side engaging portion; and an engaging element having an engaging element main body and a link member to move in the first direction away from or toward the pressed surface. The engaging element main body has a pair of main body plates arranged to overlap in the axial direction, and a pivot support shaft arranged on the side in the first direction closer to the pressed surface than the input-side engaging portion with the both side portions supported by the pair of main body plates. One pressing surface facing the pressed surface is provided on one main body plate, and the other pressing surface is provided on the other main body plate.

6 Claims, 32 Drawing Sheets

(51) Int. Cl.
*F16D 67/02* (2006.01)
*F16D 51/12* (2006.01)
*F16D 43/21* (2006.01)
*F16D 41/10* (2006.01)
*F16D 43/02* (2006.01)
*F16D 59/00* (2006.01)

(52) U.S. Cl.
CPC ............ *F16D 43/02* (2013.01); *F16D 43/211* (2013.01); *F16D 51/12* (2013.01); *F16D 59/00* (2013.01); *F16D 67/02* (2013.01)

(58) Field of Classification Search
CPC .......... F16D 51/10; F16D 51/12; F16D 59/00; F16D 59/02; F16D 65/22; F16D 67/02; F16B 1/02; F16B 1/04
USPC ........................................................ 192/223
See application file for complete search history.

(56) References Cited

U.S. PATENT DOCUMENTS

| | | | | |
|---|---|---|---|---|
| 2,359,010 A | * | 9/1944 | Smith | F16B 1/04 |
| | | | | 192/223.1 |
| 3,024,884 A | * | 3/1962 | Sieber | F16B 1/04 |
| | | | | 192/223 |
| 3,335,831 A | * | 8/1967 | Kalns | F16B 1/04 |
| | | | | 192/223 |
| 5,007,511 A | * | 4/1991 | Ostrander | F16D 59/00 |
| | | | | 192/223 |

* cited by examiner

REVERSE INPUT BLOCKING CLUTCH

CROSS REFERENCE TO RELATED APPLICATIONS

This application is a National Stage of International Application No. PCT/JP2020/035774, filed Sep. 23, 2020, claiming priorities to Japanese Patent Application No. 2019-171016, filed Sep. 20, 2019, Japanese Patent Application No. 2019-226114, filed Dec. 16, 2019, Japanese Patent Application No. 2020-058558, filed Mar. 27, 2020.

TECHNICAL FIELD

The present invention relates to a reverse input blocking clutch that transmits rotational torque inputted to an input member to an output member; however, completely blocks rotational torque that is reversely inputted to the output member and does not transmit the rotational torque to the input member, or transmits only a part of the rotational torque to the input member and blocks the remaining part.

BACKGROUND ART

The reverse input blocking clutch includes an input member that is connected to an input-side mechanism such as a drive source or the like, and an output member that is connected to an output-side mechanism such as a speed-reduction mechanism or the like, and has a function of transmitting rotational torque inputted to the input member to the output member, whereas completely blocking rotational torque that is reversely inputted to the output member and not transmitting rotational torque to the input member, or transmitting only a part of the rotational torque to the input member and blocking the remaining part.

FIGS. 26 to 32 illustrate an example of a conventional structure of a reverse input blocking clutch as described in WO 2019/026794.

A reverse input blocking clutch 101 includes an input member 102, an output member 103, a pressed member 104, and a pair of engaging elements 105.

The input member 102 is connected to an input-side mechanism such as an electric motor or the like, and rotational torque is inputted to the input member 102. As illustrated in FIG. 28, the input member 102 has an input-shaft portion 106 and a pair of input-side engaging portions 107. A small diameter base-end portion of the input-shaft portion 106 is connected to an output portion of the input-side mechanism. The pair of input-side engaging portions 107 includes convex portions extending in the axial direction from positions at two locations on opposite sides in the radial direction of the tip-end surface of the input-shaft portion 106.

The output member 103 is connected to an output-side mechanism such as a speed-reduction mechanism or the like, and outputs rotational torque. The output member 103 is arranged coaxially with the input member 102, and as illustrated in FIG. 29, has an output shaft portion 108 and an output-side engaging portion 109. The base-end portion of the output shaft portion 108 is connected to the input portion of the output-side mechanism. The output-side engaging portion 109 has a substantially elongated columnar shape, and extends in the axial direction from the central portion of the tip-end surface of the output shaft portion 108. The output-side engaging portion 109 is arranged between the pair of input-side engaging portions 107.

As illustrated in FIG. 27, the pressed member 104 has an annular shape and is fixed to another member (not illustrated) such as a housing or the like so that the rotation is restrained. The pressed member 104 is arranged coaxially with the input member 102 and the output member 103, and is arranged on the outer side in the radial direction of the pair of input-side engaging portions 107 and the output-side engaging portion 109. The inner circumferential surface of the pressed member 104 includes a pressed surface 110 which is a cylindrical concave surface.

Each of the pair of engaging elements 105 has a substantially semicircular plate shape and is arranged on the inner side in the radial direction of the pressed member 104. The pair of engaging elements 105 has outer-side surfaces in the radial direction that face a pressed surface 110, and inner-side surfaces in the radial direction that face each other. The outer-side surface in the radial direction of each of the pair of engaging elements 105 includes a pressing surface 111 that is a partially cylindrical convex surface, and the inner-side surface in the radial direction includes a bottom surface 112 having a flat surface except for the portion where an output-side engaged portion 114 that will be described later is formed. The radius of curvature of the pressing surface 111 is equal to or less than the radius of curvature of the pressed surface 110. Note that, the radial direction of the engaging elements 105 means a direction perpendicular to the bottom surface 112 indicated by the arrow A in FIG. 26, and the width direction of the engaging elements 105 is a direction parallel to the bottom surface 112 indicated by the arrow B in FIG. 26.

The dimension of the inner diameter of the pressed member 104 and the dimension in the radial direction of the engaging elements 105 are regulated so that in a state in which the pair of engaging elements 105 is arranged on the inner side in the radial direction of the pressed member 104, there are gaps in at least one of a portion between the pressed surface 110 and the pressing surfaces 111, and a portion between the bottom surfaces 112.

Each of the pair of engaging elements 105 has an input-side engaged portion 113 and an output-side engaged portion 114. The input-side engaged portion 113 includes a hole that penetrates in the axial direction through an intermediate portion in the radial direction of the engaging element 105. The input-side engaged portion 113 has a size that allows the input-side engaging portion 107 to be loosely inserted. Therefore, the input-side engaging portion 107 is able to displace with respect to the input-side engaged portion 113 (engaging element 105) in the rotation direction of the input member 102, and the input-side engaged portion 113 (engaging element 105) is able to displace in the radial direction of the engaging element 105 with respect to the input-side engaging portion 107. The output-side engaged portion 114 includes a substantially rectangular concave portion that is recessed outward in the radial direction from the central portion in the width direction of the bottom surface 112 of the engaging element 105. The output-side engaged portion 114 has a size capable of arranging the front half portion in the minor axis direction of the output-side engaging portion 109 on the inner side of the output-side engaged portion 114.

In the assembled state of the reverse input blocking clutch 101, the pair of input-side engaging portions 107 of the input member 102 arranged on one side in the axial direction are inserted in the axial direction into the input-side engaged portions 113 of the pair of engaging elements 105, and the output-side engaging portion 109 of the output member 103 arranged on the other side in the axial direction is inserted in the axial direction between the pair of output-side engaged portions 114. In other words, the pair of engaging elements 105 are arranged so as to sandwich the output-side engaging portion 109 from the outer side in the radial direction by the respective output-side engaged portions 114.

As illustrated in FIG. 30, when a rotational torque is inputted to the input member 102 from the input-side mechanism, the input-side engaging portions 107 rotate in the rotational direction of the input member 102 (clockwise direction in the example in FIG. 30) on the inner side of the input-side engaged portions 113. As a result, the inner-side surfaces in the radial direction of the input-side engaging portions 107 press the inner-side surfaces of the input-side engaged portions 113 inward in the radial direction, and causes each of the pair of engaging elements 105 to move in a direction away from the pressed surface 110. As a result, the pair of output-side engaged portions 114 sandwich the output-side engaging portion 109 of the output member 103 from both sides in the radial direction, and the output-side engaging portion 109 and the pair of output-side engaged portions 114 engage without looseness. As a result, the rotational torque inputted to the input member 102 is transmitted to the output member 103 via the pair of engaging elements 105, and is outputted from the output member 103.

On the other hand, as illustrated in FIG. 31, when a rotational torque is reversely inputted to the output member 103 from the output-side mechanism, the output-side engaging portion 109 rotates in the rotation direction of the output member 103 (clockwise in the example of FIG. 31) on the inner side of the pair of output-side engaged portions 114. Corner portions of the output-side engaging portion 109 press the bottom surfaces of the output-side engaged portions 114 outward in the radial direction, and cause each of the pair of engaging elements 105 to move in a direction approaching the pressed surface 110. As a result, the pressing surface 111 of each of the pair of engaging elements 105 is pressed against the pressed surface 110 of the pressed member 104. Consequently, the rotational torque reversely inputted to the output member 103 is completely blocked by being transmitted to the pressed member 104 that is fixed to another member (not illustrated) and is not transmitted to the input member 102, or only a part of the rotational torque reversely inputted to the output member 103 is transmitted to the input member 102, and the remaining part is blocked.

In order to completely block the rotational torque reversely inputted to the output member 103 so that no rotational torque is transmitted to the input member 102, the output member 103 is locked by tightly pressing the pair of engaging elements 105 between the output-side engaging portion 109 and the pressed member 104 so that the pressing surfaces 111 do no slide (relatively rotate) with respect to the pressed surface 110. On the other hand, in order to transmit only a part of the rotational torque that is reversely inputted to the output member 103 to the input member 102 and block the remaining part, the output member 103 is semi-locked by pressing the pair of engaging elements 105 between the output-side engaging portion 109 and the pressed member 104 so that the pressing surfaces 111 slide with respect to the pressed surface 110. When the output member 103 is in a semi-locked state and rotational torque is further reversely inputted to the output member 103, the pair of engaging elements 105 rotate about the center of rotation of the output member 103 while allowing the pressing surfaces 111 to slide with respect to the pressed surface 110 due to engagement between the output-side engaging portion 109 and the output-side engaged portions 114. When the pair of engaging elements 105 rotate, the inner-side surfaces of the input-side engaged portions 113 press the inner-side surfaces in the radial direction of the input-side engaging portions 107 in the circumferential direction (rotation direction), and part of the rotational torque is transmitted to the input member 102.

CITATION LIST

Patent Literature

Patent Literature 1: WO 2019/026794

SUMMARY OF INVENTION

Technical Problem

The conventional reverse input blocking clutch 101 described above has room for improvement from the aspect of smoothly switching from a locked state or a semi-locked state as illustrated in FIG. 31 to an unlocked state illustrated in FIG. 30 due to input of rotational torque to the input member 102.

In conventional structure, when rotational torque T is inputted to the input member 102 in a locked state or semi-locked state illustrated in FIG. 31, as illustrated in FIG. 32, the input-side engaging portions 107 of the input member 102 come in contact with the input-side engaged portions 113 of the engaging elements 105, and a translational load Ft (T=Ft·R (R is the distance from the rotation center O of the input member 102 to the contact portion X) due to the rotational torque T acts on the areas of contact X between the input-side engaging portions 107 and the input-side engaged portions 113. The direction of the translational load Ft, in other words, the direction of the load acting on each engaging element 105 from the input member 102 is greatly inclined with respect to the radial direction of the engaging element 105 (a direction of the engaging element 105 going away from or toward the pressed surface 110) which is the direction in which the engaging element 105 should move when switching from the locked state or semi-locked state to the unlocked state. From the aspect of smoothly switching from the locked state or semi-locked state to the unlocked state, it is preferable that the direction of the load acting on the engaging elements 105 from the input member 102 is substantially parallel to the radial direction of the engaging elements 105.

In view of the circumstances described above, an object of the present invention is to provide a structure of a reverse input blocking clutch capable of smoothly switching from a locked state or semi-locked state to an unlocked state when a rotational torque is inputted to an input member.

Solution to Problem

A reverse input blocking clutch of one aspect of the present invention includes a pressed member, an input member, an output member, and an engaging element.

The pressed member has a pressed surface on an inner circumferential surface thereof.

The input member has an input-side engaging portion arranged on an inner side in a radial direction of the pressed surface, and is coaxially arranged with the pressed surface.

The output member has an output-side engaging portion arranged further on the inner side in the radial direction than the input-side engaging portion on the inner side in the radial direction of the pressed surface, and is coaxially arranged with the pressed surface.

The engaging element has an engaging element main body and a link member, and is arranged on the inner side in the radial direction of the pressed surface so as to be able to move in a first direction away from or toward the pressed surface.

The engaging element main body includes: a pair of main body plates that are connected together and arranged so as to overlap with each other in an axial direction of the pressed surface; and a pivot support shaft that is arranged on a side in the first direction closer to the pressed surface than the input-side engaging portion, and has both side portions in the axial direction supported by the pair of main body plates.

The pair of main body plates has a pair of pressing surfaces facing the pressed surface and arranged on both side portions in a second direction orthogonal to the first direction and the axial direction of the pressed surface, and an output-side engaged portion that engages with the output-side engaging portion.

One pressing surface of the pair of pressing surfaces is provided on one main body plate of the pair of main body plates.

The other pressing surface of the pair of pressing surfaces is provided on the other main body plate of the pair of main body plates.

The link member is arranged between the pair of main body plates, and has a first end portion pivotally connected to the pivot support shaft, and a second end portion pivotally connected to the input-side engaging portion.

The engaging element is such that when a rotational torque is inputted to the input member, the pivot support shaft is pulled by the input-side engaging portion via the link member so that the engaging element displaces so as to move away from the pressed surface, and by causing the output-side engaged portion to engage with the output-side engaging portion, transmits the rotational torque inputted to the input member to the output member, and when a rotational torque is reversely inputted to the output member, the pair of pressing surfaces are pressed against the pressed surface due to engagement of the output-side engaging portion and the output-side engaged portion, the pair of pressing surfaces frictionally engage with the pressed surface.

In one aspect of the present invention, the engaging element main body has an insertion hole, the input-side engaging portion is inserted into the insertion hole, and there is a gap between the input-side engaging portion and the inner surface of the insertion hole allowing the input-side engaging portion to displace in a rotational direction of the input member with respect to the engaging element main body, and there is a gap allowing the engaging element main body to displace in the first direction with respect to the input-side engaging portion.

In one aspect of the present invention, the engaging element main body further includes an intermediate plate on both side portions in the second direction between the pair of main body plates and sandwiched in the axial direction between the pair of main body plates; the both sides in the axial direction of the pivot support shaft is supported by an intermediate portion in the second direction of the pair of main body plates; and the link member is pivotally arranged in the intermediate portion in the second direction between the pair of main body plates.

In one aspect of the present invention, a pair of the engaging elements are provided so as to sandwich the output-side engaging portion from both sides in the radial direction.

In one aspect of the present invention, a spring that is arranged between the pair of the engaging elements and elastically biases each of the pair of engaging elements in a direction toward the pressed surface is further provided.

In one aspect of the present invention, the spring is a coil spring, and the engaging element main body of each of the pair of the engaging elements has a convex portion that is inserted into the coil spring and holds the coil spring.

In one aspect of the present invention, the convex portion is provided in the intermediate plate of the engaging element main body.

In one aspect of the present invention, the spring is a coil spring, and the engaging element main body of each of the pair of engaging elements has a concave portion into which an end portion of the coil spring is inserted and holds the coil spring.

In one aspect of the present invention, the concave portion is provided in the intermediate plate of the engaging element main body.

In one aspect of the present invention, the pair of main body plates have the same shape as each other.

In one aspect of the present invention, the output-side engaged portion includes a concave portion that is provided on a side surface of the engaging element main body on a side far from the pressed surface in the first direction; the inner surface of the concave portion has a pair of guided surfaces facing each other in the second direction on both sides in the second direction; the output-side engaging portion has a pair of guide surfaces at two locations facing the pair of guided surfaces; and when the engaging element is displaced in the first direction in a direction away from the pressed surface by inputting a rotational torque to the input member, the engaging element is restricted from moving in the second direction by the pair of guided surfaces being guided by the pair of guide surfaces.

In one aspect of the present invention, the pair of guided surfaces are composed of a pair of concave curved surfaces that are inclined in a direction in which the distance between the guided surfaces increases as going away from the pressed surface in the first direction, and the pair of guide surfaces is composed of a pair of convex curved surfaces that can come into contact with the pair of concave curved surfaces.

Effect of Invention

With the reverse input blocking clutch of one aspect of the present invention, when a rotational torque is inputted to the input member, it is possible to smoothly switch from a state in which the pressing surface is pressed against the pressed surface (locked state or semi-locked state) to a state in which the pressing surface is separated from the pressed surface (unlocked state).

BRIEF DESCRIPTION OF THE DRAWINGS

FIG. 19A (b) is a view illustrating a state after a rotational torque is inputted to the input member from the state illustrated in FIG. 19A (a); FIG. 19B (b) is a view illustrating a state after a rotational torque is inputted to the input member from the state illustrated in FIG. 19B (a).

DESCRIPTION OF EMBODIMENTS

First Example

Figure 1:
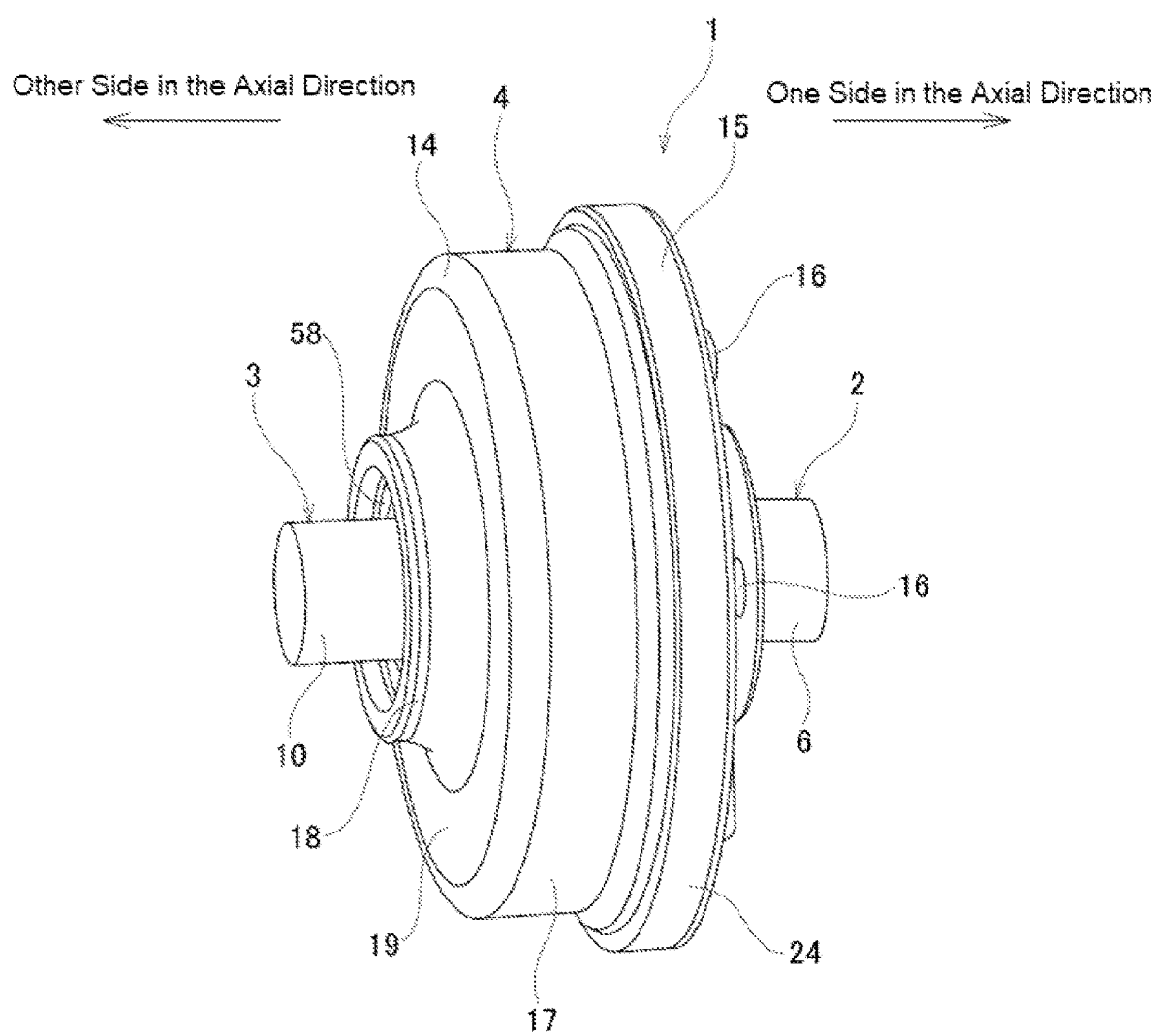
FIG. 1 is a perspective view of a reverse input blocking clutch according to a first example of an embodiment of the present invention.
Figure 2:
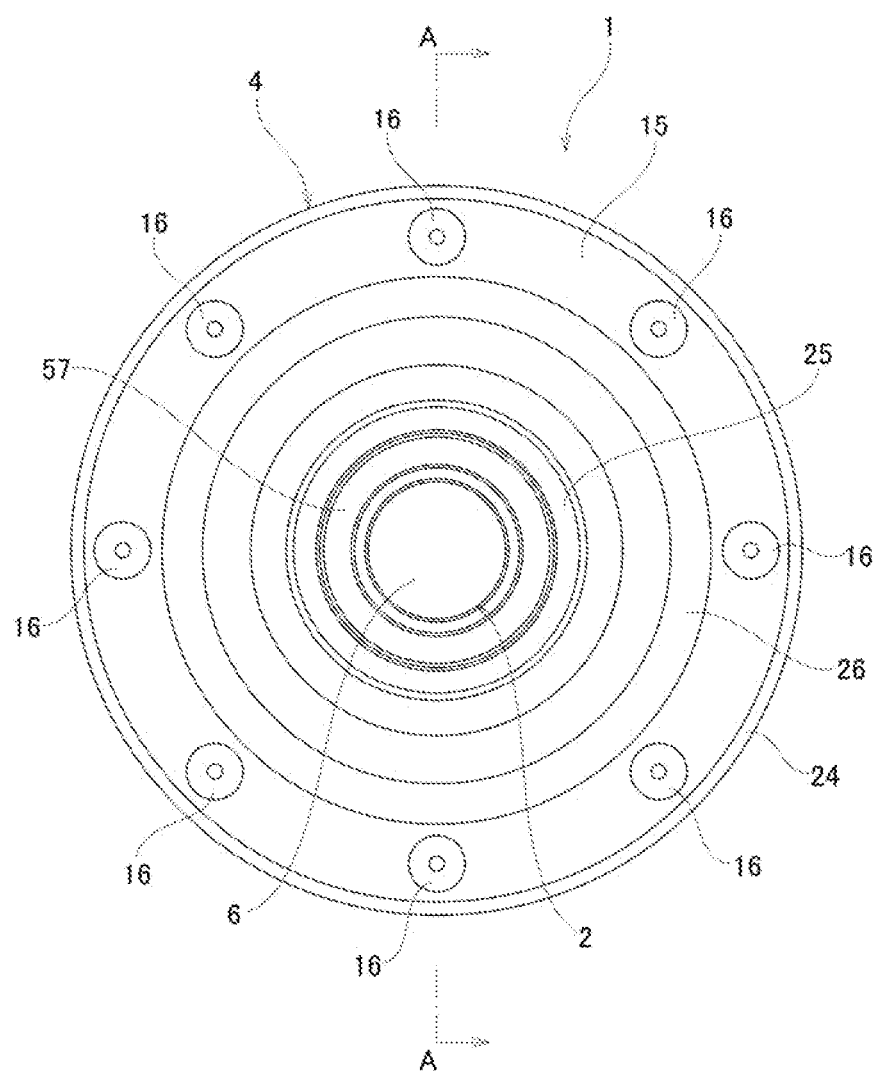
FIG. 2 is a view of the reverse input blocking clutch of the first example as viewed from the right side in the axial direction of FIG. 1.

A first example of an embodiment of the present invention will be described with reference to FIGS. 1 to 20.

Note that in the following description, the axial direction, the radial direction, and the circumferential direction, unless otherwise specified, refer to the axial direction, the radial direction, and the circumferential direction of a reverse input blocking clutch 1. In this example, the axial direction, the radial direction, and the circumferential direction of the reverse input blocking clutch 1 coincide with the axial direction, the radial direction, and the circumferential direction of the input member 2, and coincide with the axial direction, the radial direction, and the circumferential direction of the output member 3. Regarding the reverse input blocking clutch 1, one side in the axial direction is the right side of FIGS. 1, 2, 3, 4, 9, 12, 13, and 15 to 18, and the other side in the axial direction is the left side in FIGS. 1, 3, 4, 9, 12, 13 and 15 to 18.

[Explanation of the Structure of the Reverse Input Blocking Clutch]

The reverse input blocking clutch 1 of this example includes an input member 2, an output member 3, a housing 4 which is a pressed member, a pair of engaging elements 5, and a pair of springs 56. The reverse input blocking clutch 1 transmits rotational torque that is inputted to the input member 2 to the output member 2; however, has a reverse input blocking function that completely blocks rotational torque that is reversely inputted to the output member 3 and does not transmit the rotational torque to the input member 2, or transmits only a part of the rotational torque to the input member 2 and blocks the remaining part.

(Input Member 2)

Figure 3:
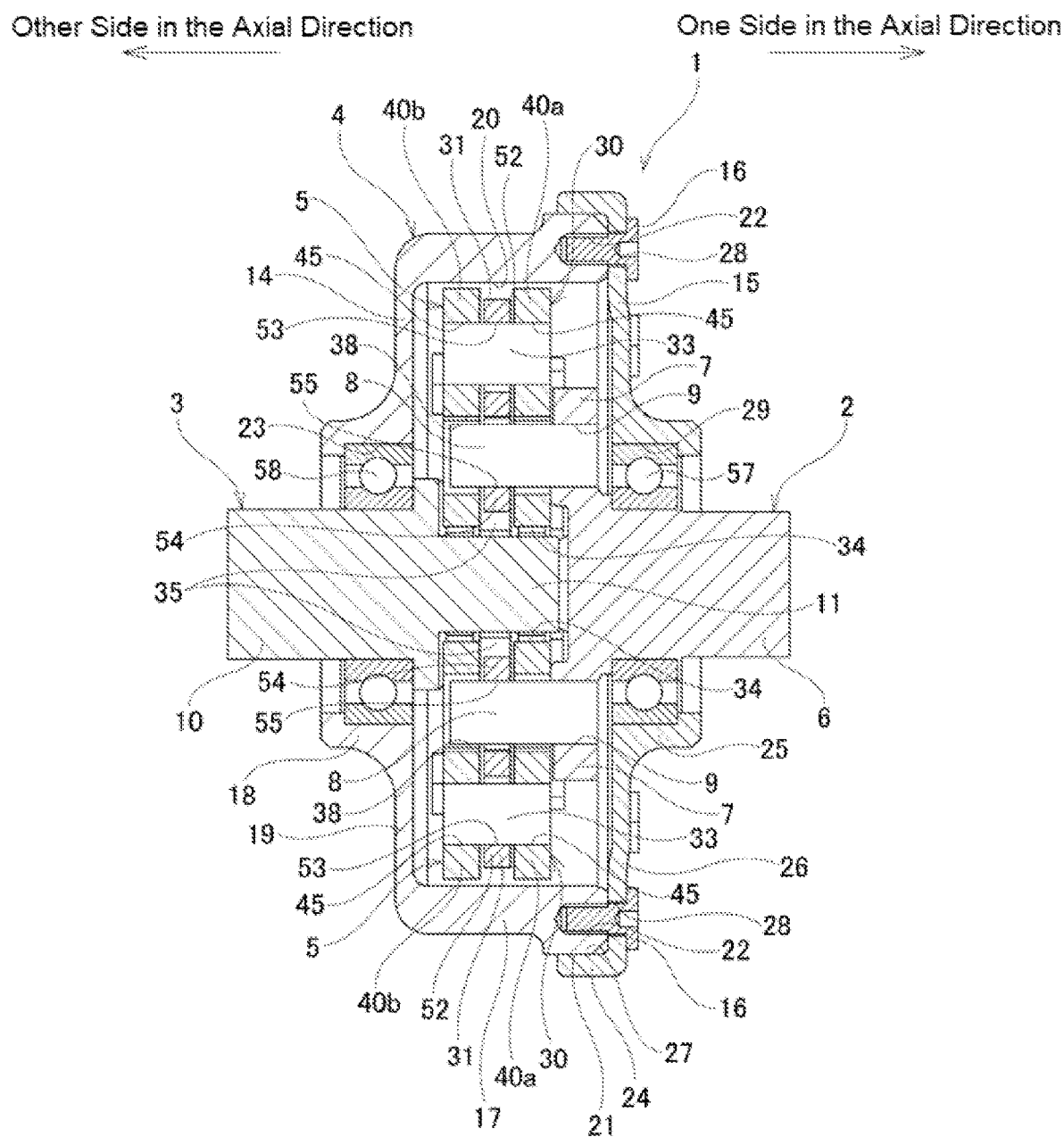
FIG. 3 is a cross-sectional view taken along the section line A-A of FIG. 2.
Figure 4:
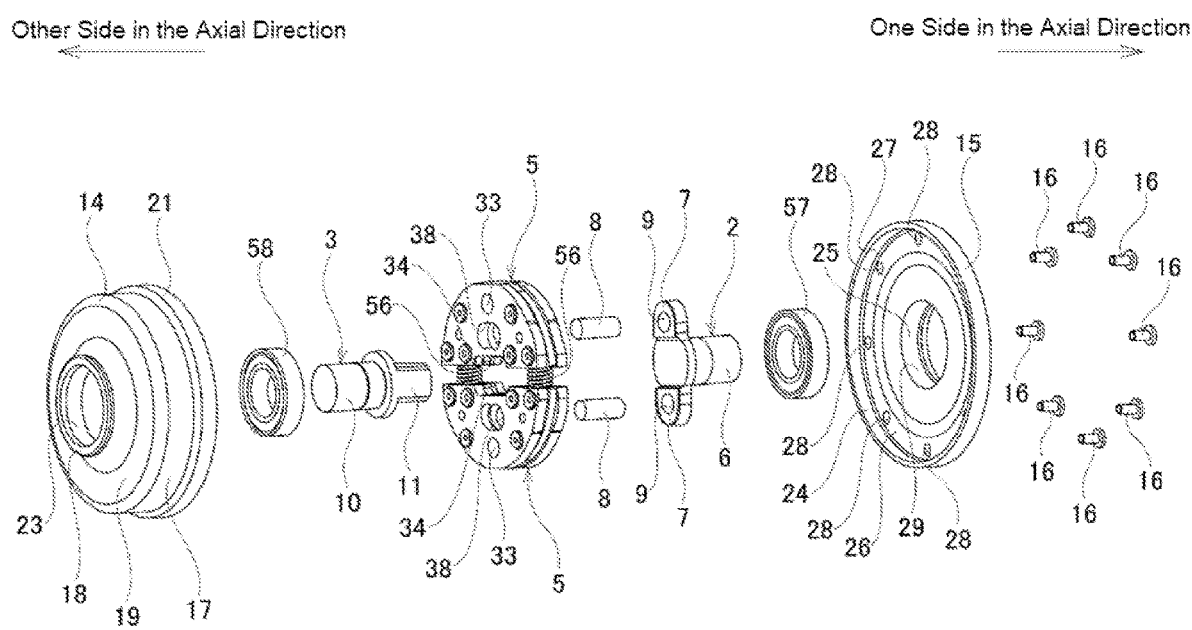
FIG. 4 is an exploded perspective view of the reverse input blocking clutch of the first example.

The input member 2 is connected to an input-side mechanism such as an electric motor or the like, and rotational torque is inputted to the input member 2. As illustrated in FIG. 3 and FIG. 4, for example, the input member 2 has an input-shaft portion 6, a pair of input arm portions 7, and a pair of input-side engaging portions 8. The input shaft portion 6 has a columnar shape, and an end portion on the one side in the axial direction of the input-shaft portion 6 is connected to the output portion of the input-side mechanism. The pair of input arm portions 7 extend from an end portion on the other side in the axial direction of the input-shaft portion 6 toward opposite sides in the radial direction from each other, and each arm portion 7 has a support hole 9 that penetrates through an intermediate portion in the radial direction. Each of the pair of input-side engaging portions 8 includes a columnar pin, and an end portion on the one side in the axial direction of each columnar pin is internally fitted by press fitting into a support hole 9 of each of the pair of input arm portions 7. In this state, the pair of input-side engaging portions 8 extend from the pair of input arm portions 7 to the one side in the axial direction. Note that the input member can be integrally configured as a whole (as one component).

(Output Member 3)

The output member 3 is connected to an output-side mechanism such as a speed-reduction mechanism or the like, and outputs rotational torque. The output member 3 is arranged coaxially with the input member 2, and as illustrated in FIG. 3 and FIG. 4, has an output shaft portion 10 and an output-side engaging portion 11. The output shaft portion 10 has a columnar shape, and an end portion on the other side in the axial direction of the output shaft portion 10 is connected to the input portion of the output-side mechanism. The output-side engaging portion 11 has a substantially elongated columnar shape, and extends to the one side in the axial direction from the central portion of an end surface on the one side in the axial direction of the output shaft portion 10. As illustrated in FIGS. 5, 6, 20A, and 20B, for example, the outer circumferential surface of the output-side engaging portion 11 has side surfaces 12 on both sides in the minor-axis direction (vertical direction in FIGS. 5, 6, 20A, and 20B), and a pair of guide surfaces 13 that are side surfaces on both sides in the major-axis direction (horizontal direction in FIGS. 5, 6, 20A, and 20B).

Each of the pair of side surfaces 12 is formed by a flat surface orthogonal to the minor-axis direction of the output-side engaging portion 11. Each of the pair of guide surfaces 13 is configured by a convex curved surface. More specifically, each of the pair of guide surfaces 13 is formed by partially cylindrical convex surfaces centered on the central axis of the output-side engaging portion 11 (the central axis of the output member 3). Therefore, regarding the output member 3, the outer circumferential surface of a round bar material, for example, can be used as the pair of guide surfaces 13, and the processing cost can be suppressed accordingly. However, in a case of implementing the present invention, the convex curved surfaces that is the pair of guide surfaces may be partially cylindrical convex surfaces centered on an axis parallel to the central axis of the output member 3, or non-cylindrical convex surfaces such as a partially elliptical shaped convex surfaces or the like. Moreover, in this example, the output shaft portion 10 and the output side engaging portion 11 are integrally formed; however, in a case of implementing the present invention, the output shaft portion and the output-side engaging portion may be separately formed from each other and may be coupled and fixed to each other. The output-side engaging portion 11 is arranged further on the inner side in the radial direction than the pair of input side engaging portions 8, and more specifically, is arranged in a portion between the pair of input-side engaging portions 8.

(Housing 4)

As Illustrated in FIGS. 1 to 4, the housing 4 has a hollow disk shape, is fixed to another member (not illustrated), and the rotation of the housing 4 is restricted. The housing 4 is arranged coaxially with the input member 2 and the output member 3, and houses the pair of input-side engaging portions 8, the output-side engaging portion 11, the pair of engaging elements 5, the pair of springs 56 and the like on the inner side thereof. The housing 4 is configured by joining an output-side housing element (main housing body) 14 arranged on the other side in the axial direction and an input-side housing element (housing cover) 15 arranged on the one side in the axial direction by a plurality of bolts 16.

The output-side housing element 14 includes an outer-diameter side cylinder portion 17, an inner-diameter side cylinder portion 18, and a side plate portion 19. The outer-diameter side cylinder portion 17 has a cylindrical shape. The inner-diameter side cylinder portion 18 has a cylindrical shape, and is arranged coaxially with the outer-diameter side cylinder portion 17 on the other side in the axial direction of the outer-diameter side cylinder portion 17. The side plate portion 19 has a circular plate shape, the end portion on the outer side in the radial direction of the side plate portion 19 is connected to the end portion on the other side in the axial direction of the outer-diameter side cylinder portion 17, and the end portion on the inner side in the radial direction of the side plate portion 19 is connected to an end portion on the one side in the axial direction of the inner-diameter side cylinder portion 18.

The inner circumferential surface of the outer-diameter side cylinder portion 17 includes a pressed surface 20 composed of a cylindrical surface centered on the center axis of the output-side housing element 14. The outer circumferential surface of an end portion on the one side in the axial direction of the outer-diameter side cylinder portion 17 has an output-side in-row fitting surface 21 that has a larger outer diameter dimension than the outer circumferential surface of the portion adjacent to the other side in the axial direction. The output-side in-row fitting surface 21 is formed of a cylindrical surface centered on the center axis of the output-side housing element 14. The end portion on the one side in the axial direction of the outer-diameter side cylinder portion 17 has screw holes 22 that open on a side surface on the one side in the axial direction at a plurality of locations (8 locations in the illustrated example) at equal intervals in the circumferential direction. The inner-diameter side cylinder portion 18 has an output-side bearing fitting surface 23 at a portion extending from an end portion on the one side to an intermediate portion in the axial direction on the inner circumferential surface. The output-side bearing fitting surface 23 is formed of a cylindrical surface centered on the center axis of the output-side housing element 14. In other words, the pressed surface 20, the output-side in-row fitting surface 21, and the output-side bearing fitting surface 23 are arranged coaxially with each other.

The input-side housing element 15 includes an outer-diameter side cylinder portion 24, an inner-diameter side cylinder portion 25, and a side plate portion 26. The outer-diameter side cylinder portion 24 has a cylindrical shape. The inner-diameter side cylinder portion 25 has a cylindrical shape, and is arranged coaxially with the outer-diameter side cylinder portion 24 on the one side in the axial direction of the outer-diameter side cylinder portion 24. The side plate portion 26 has a circular plate shape, the end portion on the outer side in the radial direction of the side plate portion 26 is connected to the end portion on the one side in the axial direction of the outer-diameter side cylinder portion 24, and the end portion on the inner side in the radial direction of the side plate portion 26 is connected to an end portion on the other side in the axial direction of the inner-diameter side cylinder portion 25.

The outer-diameter side cylinder portion 24 has an input-side in-row fitting surface 27 on the inner circumferential surface. The input-side in-row fitting surface 27 is formed of a cylindrical surface centered on the center axis of the input-side housing element 15. The input-side in-row fitting surface 27 has an inner diameter that allows the output-side housing element 14 to be fitted to the output-side in-row fitting surface 21 without looseness. The side plate portion 26 has through holes 28 at a plurality of locations at equal intervals in the circumferential direction of the end portion on the outer side in the radial direction and are aligned with the screw holes 22 of the output-side housing element 14. The inner-diameter side cylinder portion 25 has an input-side bearing fitting surface 29 at a portion extending from an end portion on the other side to an intermediate portion in the axial direction on the inner circumferential surface. The input-side bearing fitting surface 29 is formed of a cylindrical surface centered on the center axis of the input-side housing element 15. In other words, the input-side in-row fitting surface 27, and the input-side bearing fitting surface 29 are arranged coaxially with each other.

The housing 4 is assembled by coupling and fixing the output-side housing element 14 and the input-side housing element 15 together by fitting the input-side in-row fitting surface 27 of the input-side housing element 15 to the output-side in-row fitting surface 21 of the output-side housing element 14 without looseness, and screwing the bolts 16 that are inserted through the through holes 28 of the input-side housing element 15 into the screw holes 22 of the output-side housing element 14 and further tightening. In this example, the output-side in-row fitting surface 21 of the output-side housing element 14 and the output-side bearing fitting surface 23 are arranged coaxially with each other, and the input-side in-row fitting surface 27 of the input-side housing element 15 and the input-side bearing fitting surface 29 are arranged coaxially with each other. Therefore, in the assembled state of the housing 4 in which the output-side in-row fitting surface 21 and the input-side in-row fitting surface 27 are fitted without looseness, the input-side bearing fitting surface 29 and the output-side bearing fitting surface 23 are arranged coaxially with each other.

With the housing 4 in an assembled state, the input-shaft portion 6 of the input member 2 is rotatably supported by the input-side bearing 57 with respect to the input-side bearing fitting surface 29 of the input-side housing element 15. Moreover, the output shaft portion 10 of the output member 3 is rotatably supported by the output-side bearing 58 with respect to the output-side bearing fitting surface 23 of the output-side housing element 14. As a result, the input member 2 and the output member 3 are arranged coaxially with each other and are arranged coaxially with the pressed surface 20 of the housing 4. Furthermore, in this state, the pair of input-side engaging portions 8 and output-side engaging portions 11 are arranged on the inner side in the radial direction of the pressed surface 20 of the housing 4. Note that regarding the reverse input blocking clutch 1, in a case where it is desired to raise the performance (unlocking performance) or the like of switching from the locked state or semi-locked state to the unlocked state, which will be described later, the coaxiality and inclination of the input member 2 and the output member 3 must be strictly managed. In that case, it is possible to apply a general bearing utilization method such as changing each of the input-side bearing 57 and the output-side bearing 58 from a single-row rolling bearing as illustrated in the figure to a double-row rolling bearing or the like.

(Pair of Engaging Elements 5)

The reverse input blocking clutch 1 of this example is provided with a pair of engaging elements 5. The pair of engaging elements 5 is arranged on the inner side in the radial direction of the pressed surface 20. Each of the pair of engaging elements 5 includes an engaging element main body 30 and a link member 31 that is pivotally connected to the engaging element main body 30.

(Engaging Element Main Body 30)

In the structure of this example, the engaging element main body 30 is formed by combining a plurality of parts as illustrated in FIGS. 13 to 18. Hereinafter, the structure of the engaging element main body 30 after assembly will be described, and then the structure of each of the components of the engaging element main body 30 will be described.

The engaging element main body 30 has a substantially semicircular plate shape, and has a pair of pressing surfaces 32*a*, 32*b* facing the pressed surface 20, a pivot support shaft 33, which is a pivot support portion, and an output-side engaged portion 34 that engages with the output-side engaging portion 11.

In this example, the outer circumferential surface of the engaging element main body 30 is composed of an outer-side surface in the radial direction that has a convex arc shape that corresponds to the arc of the engaging element main body 30, and an inner-side surface in the radial direction that has a crank shape that corresponds to the chord of the engaging element main body 30. Note that the radial direction of the engaging element main body 30 refers to the direction indicated by arrow A in FIG. 5, and is a direction orthogonal to the chord of the engaging element main body 30. Moreover, the width direction of the engaging element main body 30 refers to the direction indicated by arrow B in FIG. 5, and is a direction parallel to the chord of the engaging element main body 30. Note that in this example, the radial direction of the engaging element main body 30 is the direction in which the engaging element main body 30 (engaging elements 5) moves when going away from or toward the pressed surface 20, and corresponds to a first direction. Moreover, in this example, the width direction of the engaging element main body 30 corresponds to a second direction that is orthogonal to the first direction and the axial direction of the pressed surface 20.

In this example, the pair of engaging elements 5, in a state in which the outer-side surfaces in the radial direction of the engaging element main bodies 30 face toward opposite sides from each other, and the inner-side surfaces in the radial direction of the engaging element main bodies 30 face each other, is arranged on the inner side in the radial direction of the pressed surface 20. The dimension of the inner diameter of the pressed surface 20 and the dimension in the radial direction of the engaging element main bodies 30 are regulated such that in a state in which the pair of engaging elements 5 is arranged on the inner side in the radial direction of the pressed surface 20, there are gaps in at least one of the portions between the pressed surface 20 and the outer-side surfaces in the radial direction of the engaging element main bodies 30 and the portions between the inner-side surfaces in the radial direction of the engaging element main bodies 30 that allow the engaging element main bodies 30 to move in the radial direction.

The engaging element body 30 has a pair of pressing surfaces 32*a*, 32*b* that face the pressed surface 20 on the outer-side surface in the radial direction. The pair of pressing surfaces 32a, 32b are portions that are pressed against the pressed surface 20 in the locked or semi-locked state of the output member 3, and are arranged in portions on both sides in the width direction of the engaging element main body 30. In other words, the pair of pressing surfaces 32a, 32b are arranged on both side portions in the circumferential direction on the outer-side surface in the radial direction of the engaging element main body 30 so as to be separated in the circumferential direction. Each of the pair of pressing surfaces 32a, 32b protrudes further toward the pressed surface 20 than the portions of the outer-side surface of the engaging element main body 30 that are separated from the pressing surfaces 32a, 32b. Each of the pair of pressing surfaces 32a, 32b includes a partially cylindrical convex surface having a radius of curvature smaller than the radius of curvature of the pressed surface 20. Of the outer-side surface in the radial direction of the engaging element main body 30, the portion separated from the pair of pressing surfaces 32a, 32b in the circumferential direction (portion located between the pair of pressing surfaces 32a, 32b in the circumferential direction) is a non-contact surface that does not come in contact with the pressed surface 20.

The engaging element main body 30 has an internal space 35 at the central portion in the thickness direction (axial direction) of the central portion in the width direction. The end portions on both sides in the radial direction of the internal space 35 are open to the outer-side surface in the radial direction and the inner-side surface in the radial direction of the engaging element main body 30, respectively. The engaging element main body 30 has a pivot support shaft 33 arranged in the axial direction, and the intermediate portion in the axial direction of the pivot support shaft 33 is arranged in the outer-side portion in the radial direction of the central portion in the width direction of the internal space 35. The pivot support shaft 33 is composed of a columnar pin, and the end portions on both sides in the axial direction are supported by portions of the engaging element main body 30 that sandwich the internal space 35 from both sides in the axial direction.

The engaging element main body 30 has an output-side engaged portion 34 at a central portion in the width direction of the inner-side surface in the radial direction. The output-side engaged portion 34 includes a substantially rectangular concave portion that is recessed outward in the radial direction from the central portion in the width direction of the inner-side surface (side surface on the far side from the pressed surface 20) in the radial direction of the engaging element main body 30.

Figure 5:
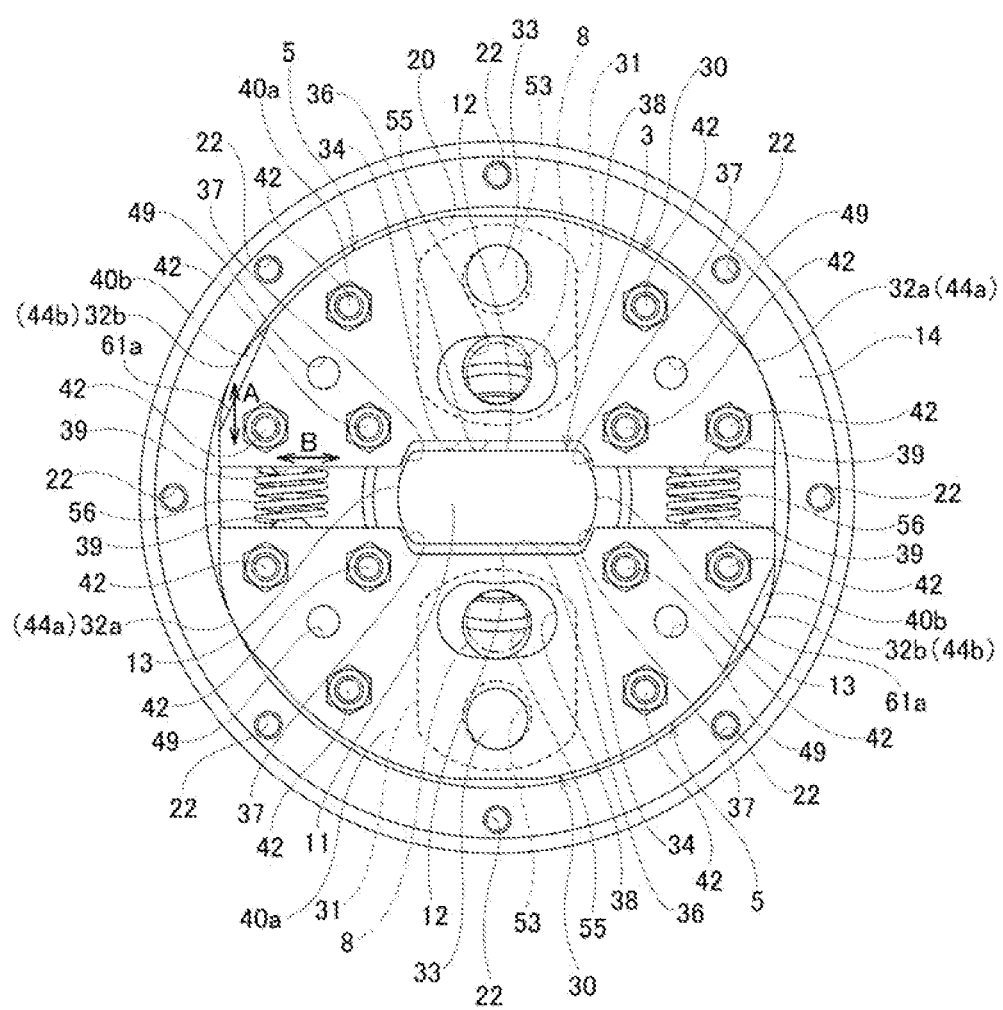
FIG. 5 is a view as seen from the right side in FIG. 3, and illustrates the reverse input blocking clutch with an input member, an input-side housing element, and an input-side bearing removed therefrom in a neutral state in which a rotational torque is not reversely inputted to the output member.
Figure 6:
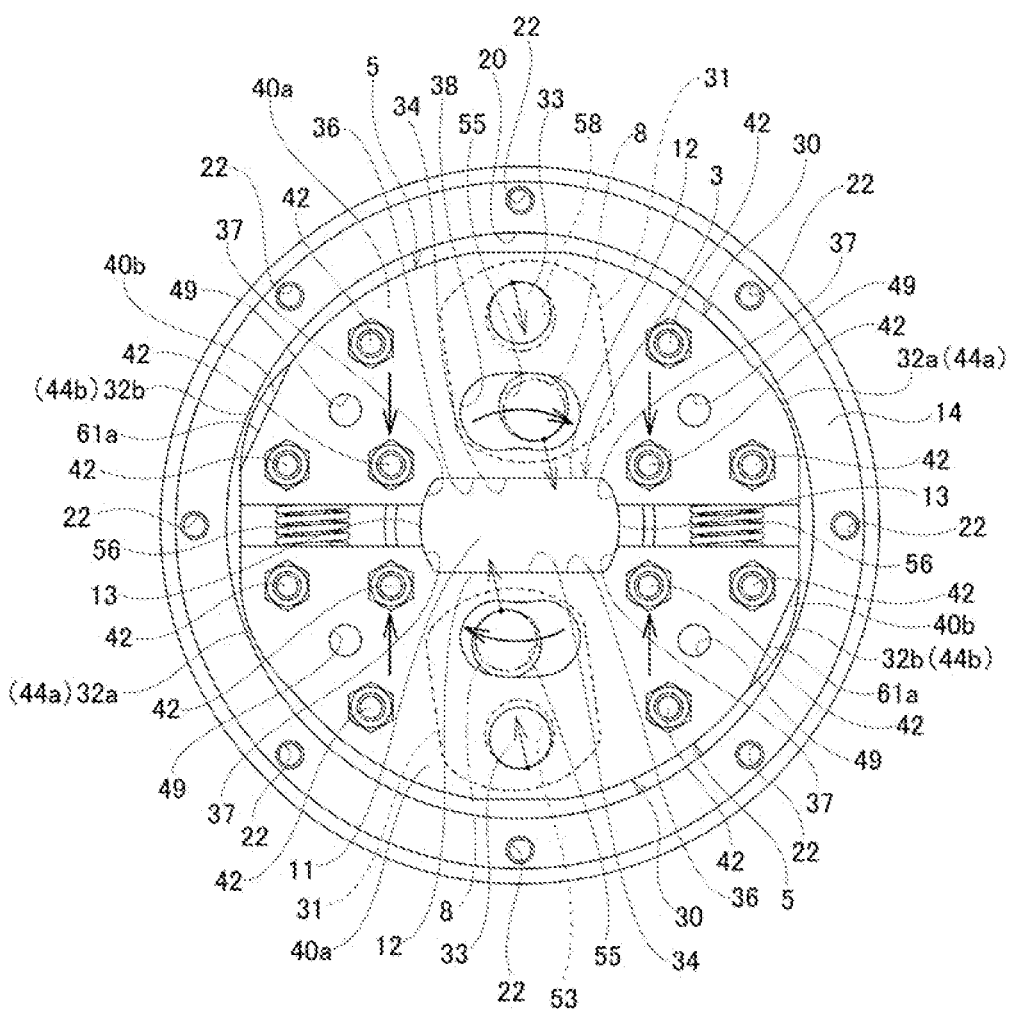
FIG. 6 is a view similar to FIG. 5 illustrating a state in which a rotational torque is inputted to the input member.

As illustrated in FIGS. 5, 6, 20A, and 20B, for example, the output-side engaged portion 34 has a size such that a front half portion in the minor axis direction of the output-side engaging portion 11 can be placed on the inner side thereof. In particular, in this example, as illustrated in FIGS. 6 and 20B, the output-side engaged portion 34 has an inner surface shape that matches the outer circumferential surface of the front half portion in the minor axis direction of the output-side engaging portion 11.

The inner surface of the output-side engaged portion 34 has a bottom surface 36 and a pair of guided surfaces 37. The bottom surface 36 is composed of a flat surface that is orthogonal to the radial direction of the engaging element main body 30. The pair of guided surfaces 37 are located at the end portions on both sides in the width direction of the engaging element main body 30 on the inner surface of the output-side engaged portion 34, and face each other in the width direction. The pair of guided surfaces 37 are configured by a pair of concave curved surfaces that are inclined in a direction in which the distance between the guided surfaces 37 increases as going toward the inner side in the radial direction of the engaging element main body 30, or in other words, as going away from the pressed surface 20 in the radial direction of the engaging element main body 30.

The pair of guided surfaces 37 is able to come in contact with the pair of guide surfaces 13 of the output-side engaging portion 11, and each guided surface 37 is configured by a partially cylindrical concave surface having a radius of curvature equal to that of the guide surface 13 or a radius of curvature slightly larger than that of the guide surface 13. In other words, in this example, as illustrated in FIGS. 6 and 20B, the output-side engaged portion 34 has an inner surface shape that matches the outer circumferential surface of the front half portion in the minor axis direction of the output-side engaging portion 11. That is, the bottom surface 36 of the output-side engaged portion 34 is brought into surface contact with the side surface 12 of the output-side engaging portion 11, and the pair of guided surfaces 37 of the output-side engaged portion 34 can be brought into surface contact with the front half portion in the minor axis direction of the pair of guide surfaces 13 of the output-side engaging portion 11. Note that in a case of implementing the present invention, the guided surfaces may be formed of non-cylindrical concave surfaces such as partially elliptical shaped concave surfaces or the like.

The engaging element main body 30 has an insertion hole 38 in the inner-side portion in the radial direction of the central portion in the width direction. The insertion hole 38 is composed of an arc-shaped elongated hole that penetrates in the axial direction through the inner-side portion in the radial direction of the central portion in the width direction of the engaging element main body 30, and extends in the circumferential direction. The insertion hole 38 has a size that allows the input-side engaging portion 8 to be loosely inserted. More specifically, when the input-side engaging portion 8 is inserted inside the insertion hole 38, a gap in the circumferential direction and a gap in the radial direction of the engaging element main body 30 are provided between the input-side engaging portion 8 and the inner surface of the insertion hole 38. Therefore, the input-side engaging portion 8 is able to displace with respect to the insertion hole 38 (engaging element main body 30) in the rotation direction of the input member 2 due to the gap in the circumferential direction, and the insertion hole 38 (engaging element main body 30) is able to displace in the radial direction of the engaging element main body 30 with respect to the input-side engaging portion 8 due to the gap in the radial direction of the engaging element main body 30. In other words, the size of the insertion hole 38 is regulated so that when operating the reverse input blocking clutch 1 described later, the inner circumferential edge of the insertion hole 38 and the input-side engaging portion 8 do not interfere with each other to hinder the operation.

The engaging element main body 30 has protruding convex portions 39 protruding inward in the radial direction on both side portions in the width direction on the inner-side surface in the radial direction. The convex portions 39 protrudes inward in the radial direction from the central portion in the thickness direction (axial direction) on both side portions in the width direction of the inner-side surface in the radial direction of the engaging element main body 30. The convex portions 39 are used for holding the springs 56 described later.

The engaging element main body 30 is configured by combining a plurality of parts. More specifically, the engaging element main body 30 includes a pair of main body plates 40*a*, 40*b*, a pair of intermediate plates 41, a pivot support shaft 33, and a plurality of bolts 42 and nuts 43 as coupling members.

The pair of main body plates 40*a*, 40*b* are parts constituting both side portions in the thickness direction of the engaging element main body 30, and are arranged so as to be superimposed in the axial direction. Each of the pair of main body plates 40*a*, 40*b* is a press-molded product formed by punching a metal plate such as a steel plate or the like by press working, and has a substantially semicircular plate shape. In particular, in this example, each of the pair of main body plates 40*a*, 40*b* has a shape in which both side portions in the width direction of the outer-side surface in the radial direction are asymmetric with respect to the width direction, or in other words, has a non-mirror-symmetrical shape with respect to a virtual plane that passes through the central portion in the width direction and is orthogonal to the width direction. More specifically, in this example, the pair of main body plates 40*a*, 40*b* are parts having the same shape and size as each other, and are arranged in a state in which the directions in the thickness direction (axial direction) are reversed from each other.

One main body plate 40*a* of the pair of main body plates 40*a*, 40*b*, which is arranged on the one side in the axial direction, has a convex surface 44*a* on an end portion on one side in the circumferential direction of the outer-side surface in the radial direction, and has a retracting surface 61*a* on an end portion of the other side in the circumferential direction of the outer-side surface in the radial direction. The convex surface 44*a* is composed of a partially cylindrical convex surface that protrudes further toward the pressed surface 20 than a portion of the outer-side surface in the radial direction of the one main body plate 40*a* that is separated from the convex surface 44*a* in the circumferential direction. In the assembled state of the engaging element main body 30, the convex surface 44*a* constitutes one pressing surface 32*a* of the pair of pressing surfaces 32*a*, 32*b*, which is arranged on one side in the circumferential direction. The retracting surface 61*a* is composed of a flat surface (cut-off surface) that retracts further with respect to the pressed surface 20 than the portion of the outer-side surface in the radial direction of the one main body plate 40*a* that is separated from the retracting surface 61*a* in the circumferential direction.

The other main body plate 40*b* of the pair of main body plates 40*a*, 40*b*, which is arranged on the other side in the axial direction, has a retracting surface 61*b* on an end portion of the one side in the circumferential direction of the outer-side surface in the radial direction, and has a convex surface 44*b* on an end portion on the other side in the circumferential direction of the outer-side surface in the radial direction. The convex surface 44*b* is composed of a partially cylindrical convex surface that protrudes further toward the pressed surface 20 than a portion of the outer-side surface in the radial direction of the other main body plate 40*b* than a portion separated from the convex surface 44*b* in the circumferential direction. In the assembled state of the engaging element main body 30, the convex surface 44*b* constitutes the other pressing surface 32*a* of the pair of pressing surfaces 32*a*, 32*b*, which is arranged on the other side in the circumferential direction. The retracting surface 61*b* is composed of a flat surface (cut-off surface) that retracts further with respect to the pressed surface 20 than a portion of the outer-side surface in the radial direction of the other main body plate 40*b* that is separated from the retracting surface 61*b* in the circumferential direction.

The retracting surface 61*a* of the one main body plate 40*a* is arranged at a position in the circumferential direction that matches with the convex surface 44*b* of the other main body plate 40*b*. Further, the retracting surface 61*b* of the other main body plate 40*b* is arranged at a position in the circumferential direction that matches with the convex surface 44*a* of the one main body plate 40*a*. Of the outer-side surfaces in the radial direction of the pair of main body plates 40*a*, 40*b*, the portions that are separated from the convex surfaces 44*a*, 44*b* (pressing surfaces 32*a*, 32*b*) retract more than the convex surfaces 44*a*, 44*b* with respect to the pressed surface 20, and do not come into contact with the pressed surface 20. Note that in a case of implementing the present invention, as long as the condition that of the outer-side surfaces in the radial direction of the pair of main body plates 40*a*, 40*b*, the portions separated from the convex surfaces 44*a*, 44*b* retract more than the convex surfaces 44*a*, 44*b* with respect to the pressed surface 20, or in other words, as long as the condition that those portions do not come in contact with the pressed surface 20 is satisfied, the shape of the portions is not particularly limited. For example, the portions where the retracting surfaces 61*a*, 61*b* of this example are located do not necessarily have to be a flat surface, and may be a curved surface having a curvature that retracts more than the convex surfaces 44*a*, 44*b* with respect to the pressed surface 20.

Each of the pair of main body plates 40*a*, 40*b* has a circular support hole 45 in an outer-side portion in the radial direction of the central portion in the width direction. In the central portion in the width direction of the inner-side surface in the radial direction of each of the pair of main body plates 40*a*, 40*b*, there is a concave portion 46 that forms the output-side engaged portion 34 in the assembled state of the engaging element main body 30. In the inner-side portion in the radial direction of the central portion in the width direction of each of the pair of main body plates 40*a*, 40*b*, there is a through hole 47 forming an insertion hole 38 in the assembled state of the engaging element main body 30. In both side portions in the width direction of each of the pair of main body plates 40*a*, 40*b*, there is a plurality of (three in the illustrated example) through holes 48. In locations separated from the plurality of through holes 48 in both side portions in the width direction of each of the pair of main body plates 40*a*, 40*b*, there are positioning holes 49.

A pair of intermediate plates 41 are members that form an intermediate portion in the thickness direction of the engaging element main body 30. Each of the pair of intermediate plates 41 is a press-molded product formed by punching a metal plate such as a steel plate or the like by press working, and has a substantially fan plate shape. The pair of intermediate plates 41 are sandwiched between both side portions in the width direction of the pair of main body plates 40*a*, 40*b*. Each of the pair of intermediate plates 41 has a convex portion 39 in an intermediate portion in the width direction of the inner-side surface in the radial direction. The convex portion 39 projects further toward the inner side in the radial direction than the inner-side surfaces in the radial direction of the pair of main body plates 40*a*, 40*b*. Of each of the pair of intermediate plates 41, the portions other than the convex portion 39 are arranged between the pair of main body plates 40*a*, 40*b*. In particular, the outer-side surface in the radial direction of each of the pair of intermediate plates 41 is located further on the inner side in the radial direction than the outer-side surfaces in the radial direction of the pair of main body plates 40*a*, 40*b*, and does not come in contact with the pressed surface 20. In each of the pair of intermediate plates 41, there are through holes 50 at a plurality of locations that match the through holes 48 in the pair of main body plates 40*a*, 40*b*. In each of the pair of intermediate plates 41, at locations that are aligned with the positioning holes 49 in the pair of main body plates 40*a*, 40*b*, there are positioning holes 51.

The pair of main body plates 40*a*, 40*b* and the pair of intermediate plates 41 are connected and fastened together by inserting a plurality of bolts 42 through the through holes 48 in the pair of main body plates 40*a*, 40 and the though holes 50 in the pair of intermediate plates 41 that are aligned with each other, and screwing nuts 43 on the tip-end portion of the bolts 42 and further tightening. Note that in the structure of this example, when performing this kind of connecting and fastening work, the work of aligning the through holes 48 in the pair of main body plates 40*a*, 40*b* with the though holes 50 in the pair of intermediate plates 41 may be easily performed by inserting positioning rods for work into positioning holes 49 in the pair of main body plates 40*a*, 40*b* and positioning holes 51 in the pair of intermediate plates 41 that are aligned with each other. In the structure of this example, in a state in which the pair of main body plates 40*a*, 40*b* and the pair of intermediate plates 41 are connected and fastened as described above, an internal space 35 is formed between the pair of main body plates 40*a*, 40*b*, and between the pair of intermediate plates 41 in the width direction.

The pivot support shaft 33 is composed of a columnar pin. The end portions on both sides in the axial direction of the pivot support shaft 33 are internally fitted and fixed to support holes 45 in the pair of main body plates 40*a*, 40*b* by press fitting. The intermediate portion in the axial direction of the pivot support shaft 33 is arranged in the internal space 35.

(Link Member 31)

The link member 31 is a press-molded product formed by punching a metal plate such as a steel plate or the like by press working, and has a substantially rectangular plate shape or a substantially oblong disk shape, and is arranged in the internal space 35 of the engaging element main body 30 (between the pair of main body plates 40*a*, 40*b*).

The thickness dimension of the link member 31 is smaller than the width dimension in the axial direction of the internal space 35, which is equal to the distance between the side surfaces of the pair of main body plates 40*a*, 40*b* facing each other and the thickness dimension of the intermediate plate 41. The link member 31 has a first hole 53 in a first end portion 52, which is an end portion on one side in the longitudinal direction, and has a second hole 55 that corresponds to the input-side engaged portion in a second end portion 54, which is an end portion on the other side in the longitudinal direction.

A pivot support shaft 33 is inserted through the first hole 53. As a result, the first end portion 52 is connected to the pivot support shaft 33 so as to be able to pivot. The input-side engaging portion 8 is inserted through the second hole 55. As a result, the second end portion 54 is connected to the input-side engaging portion 8 so as to be able to pivot.

Figure 8:
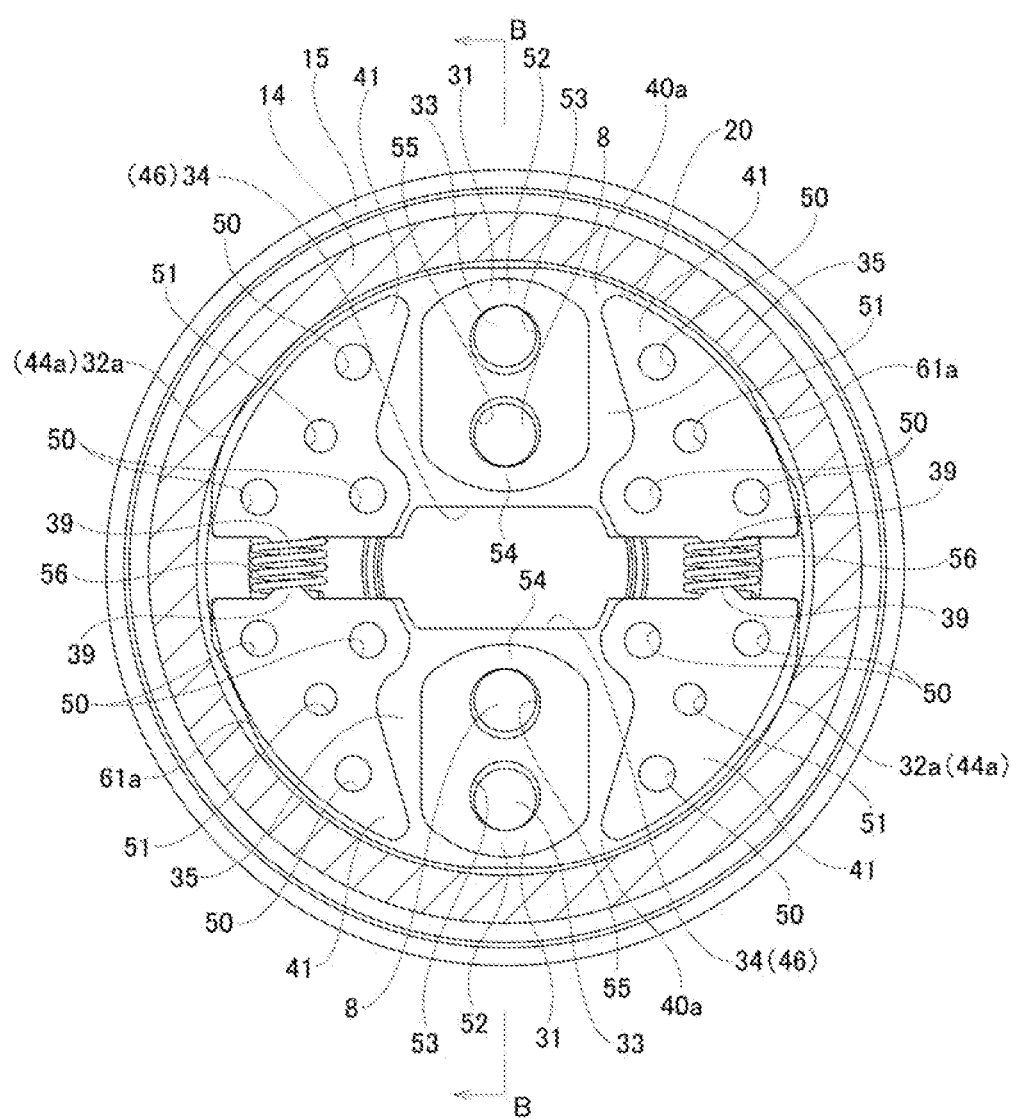
FIG. 8 is a view as seen from the left in FIG. 3, and illustrates the reverse input blocking clutch with an output member, a left-side end portion of an output-side housing element, an output-side bearing, a left-side main body plate, a bolt, and a nut removed therefrom.
Figure 9:
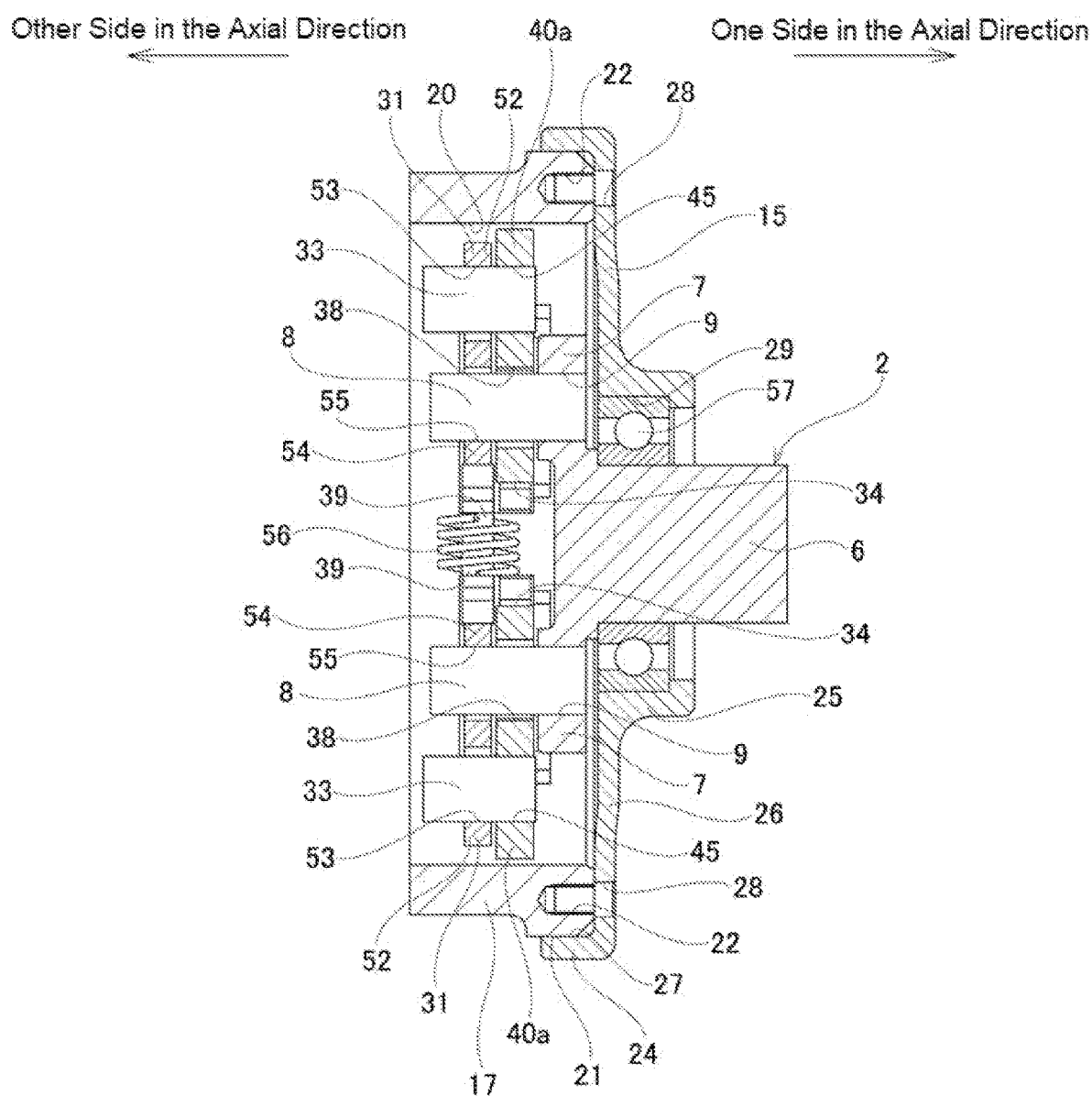
FIG. 9 is a cross-sectional view taken along section line B-B of FIG. 8.
Figure 10:
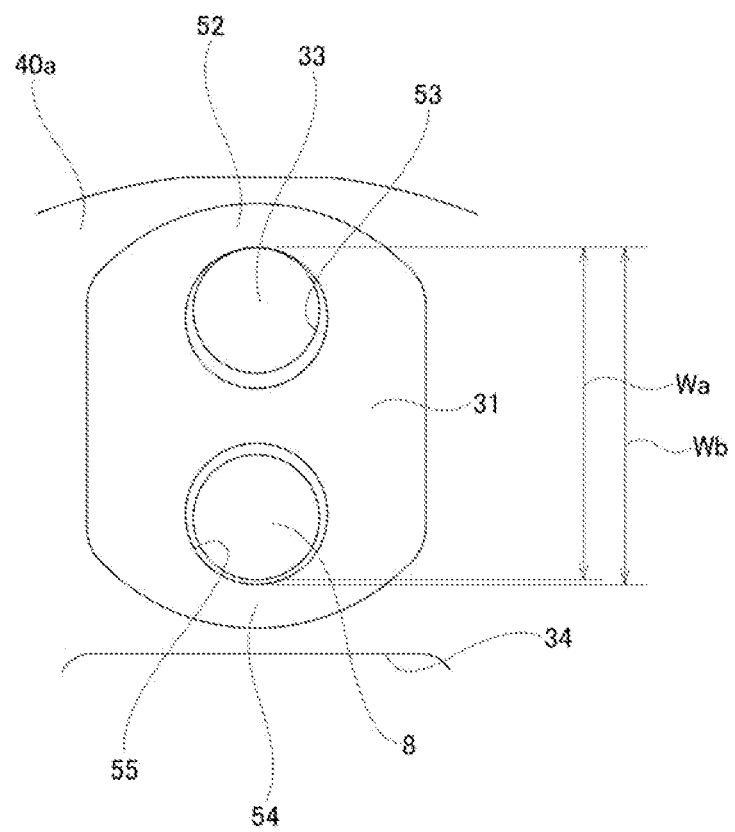
FIG. 10 is an enlarged view of the central portion in the left-right direction of the upper half portion of FIG. 8.
Figure 11:
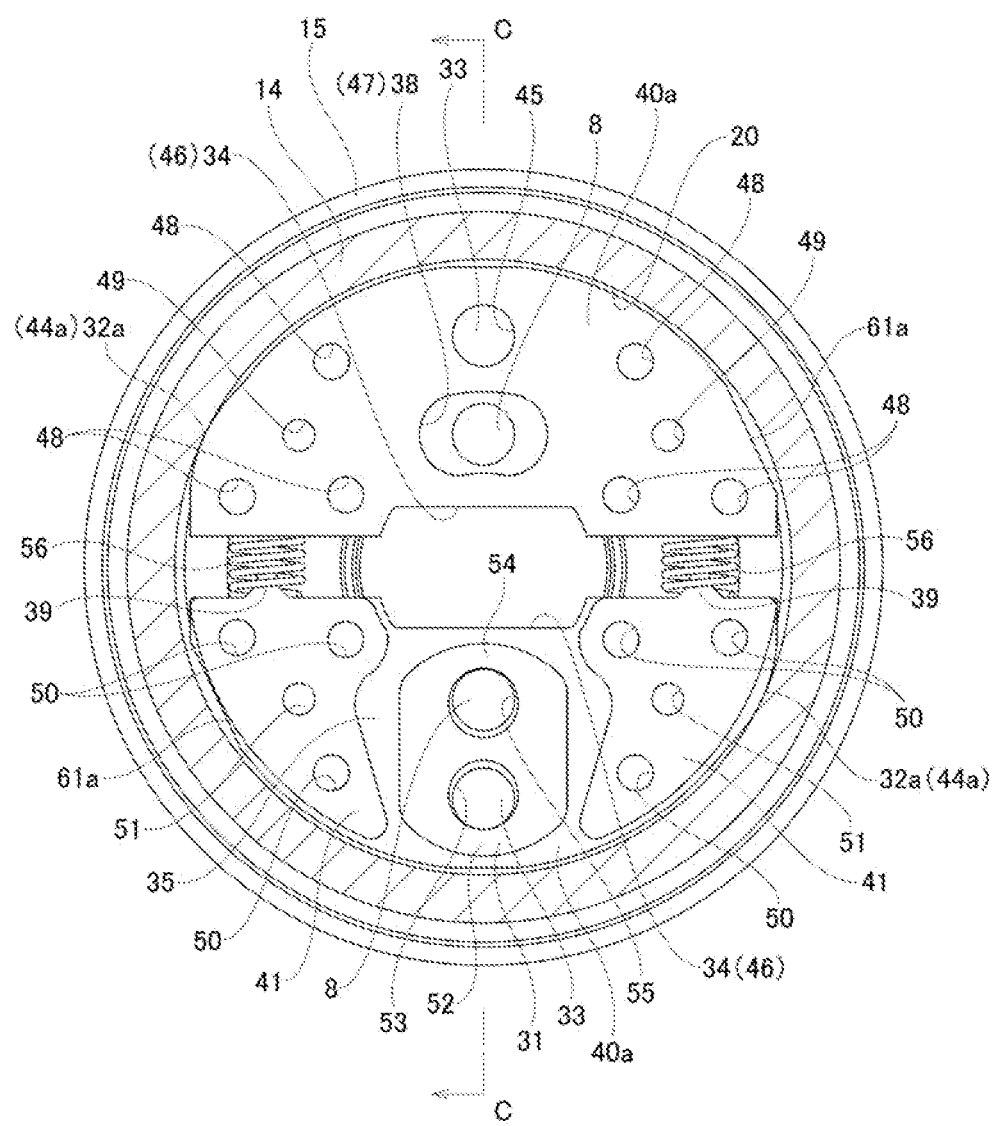
FIG. 11 is a view in which intermediate plates and link members are removed from the upper half portion of FIG. 8.
Figure 12:
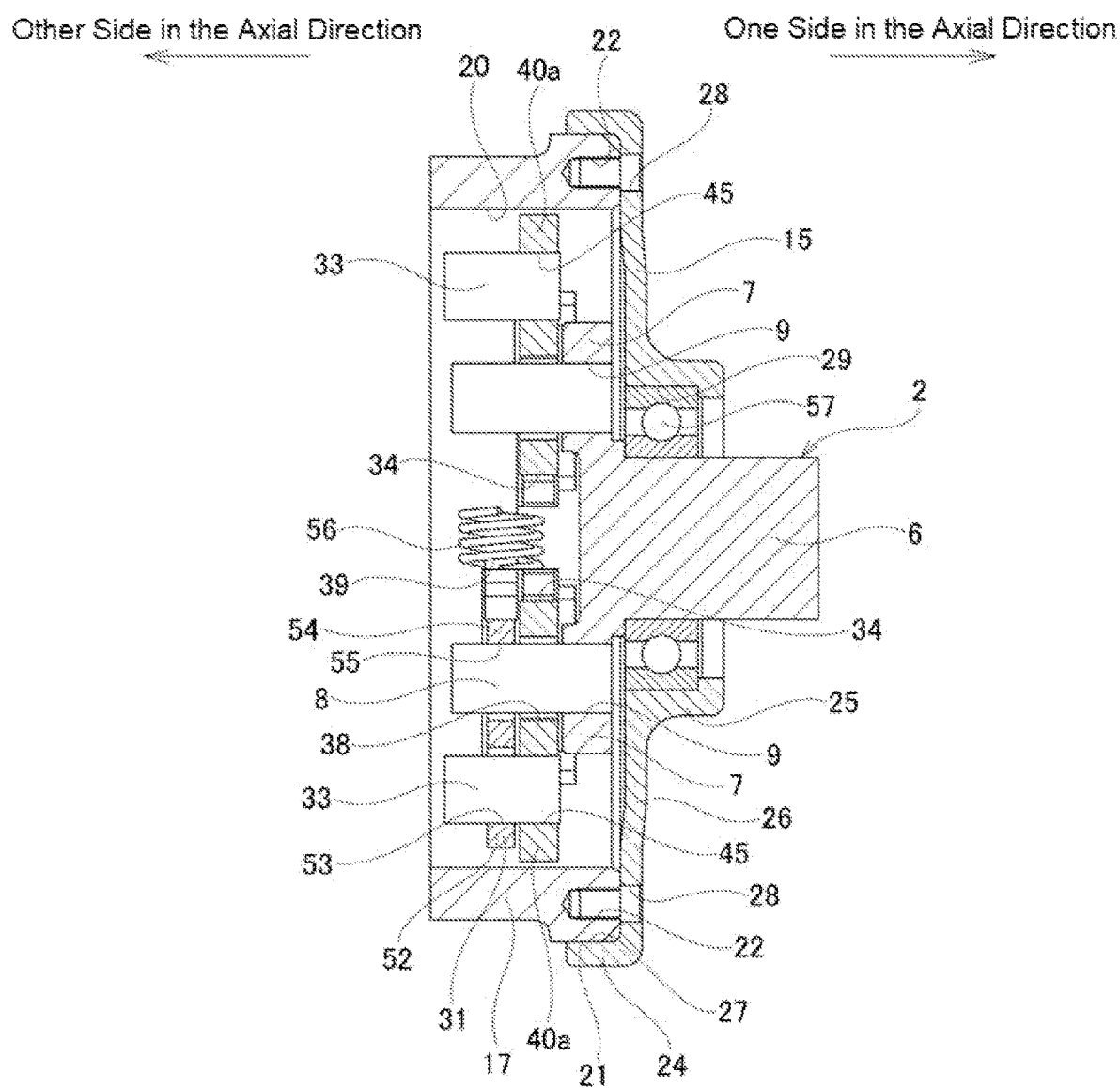
FIG. 12 is a cross-sectional view taken along section line C-C of FIG. 11.
Figure 13:
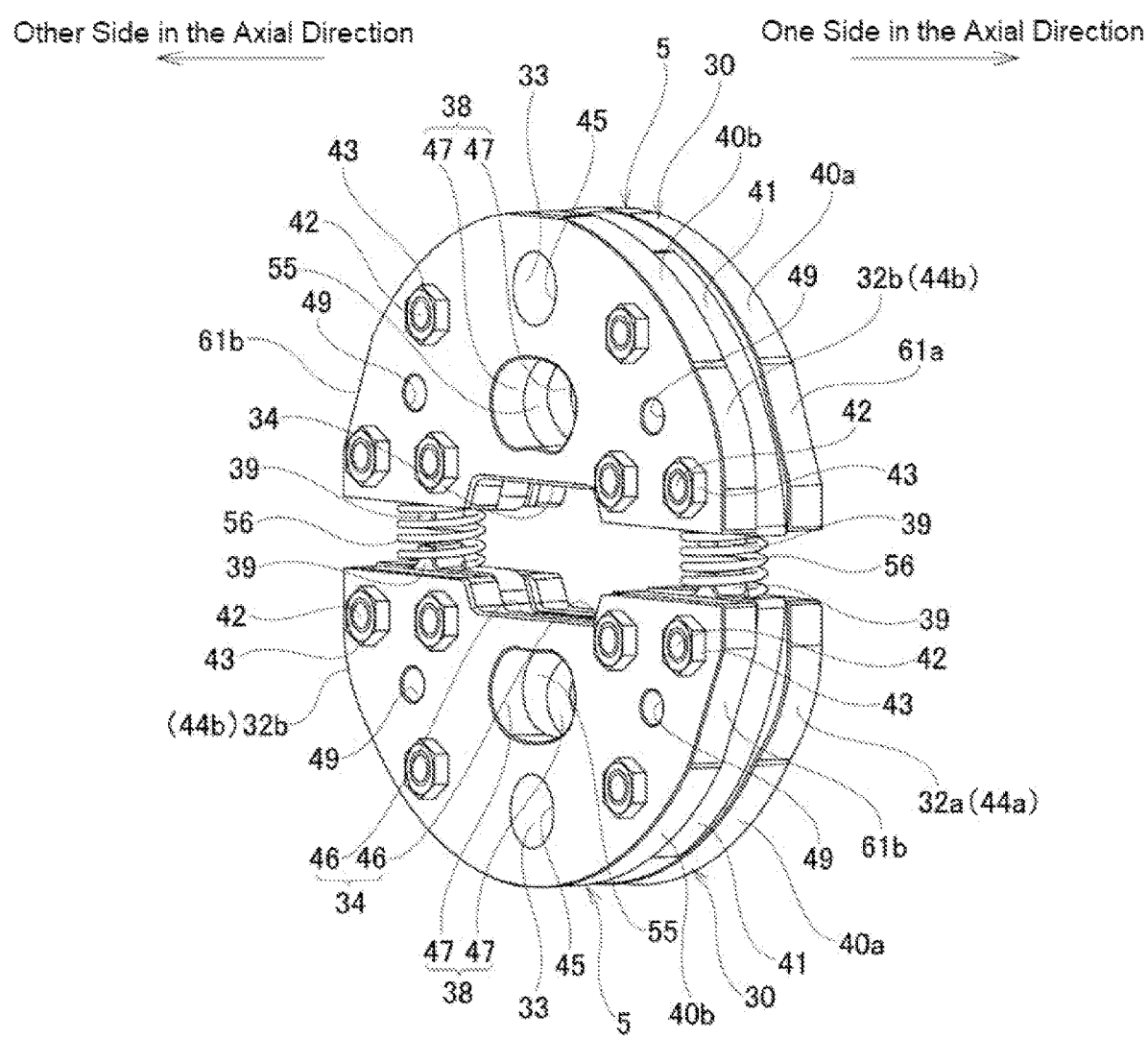
FIG. 13 is a perspective view of a pair of engaging elements and springs of the reverse input blocking clutch of the first example.
Figure 14:
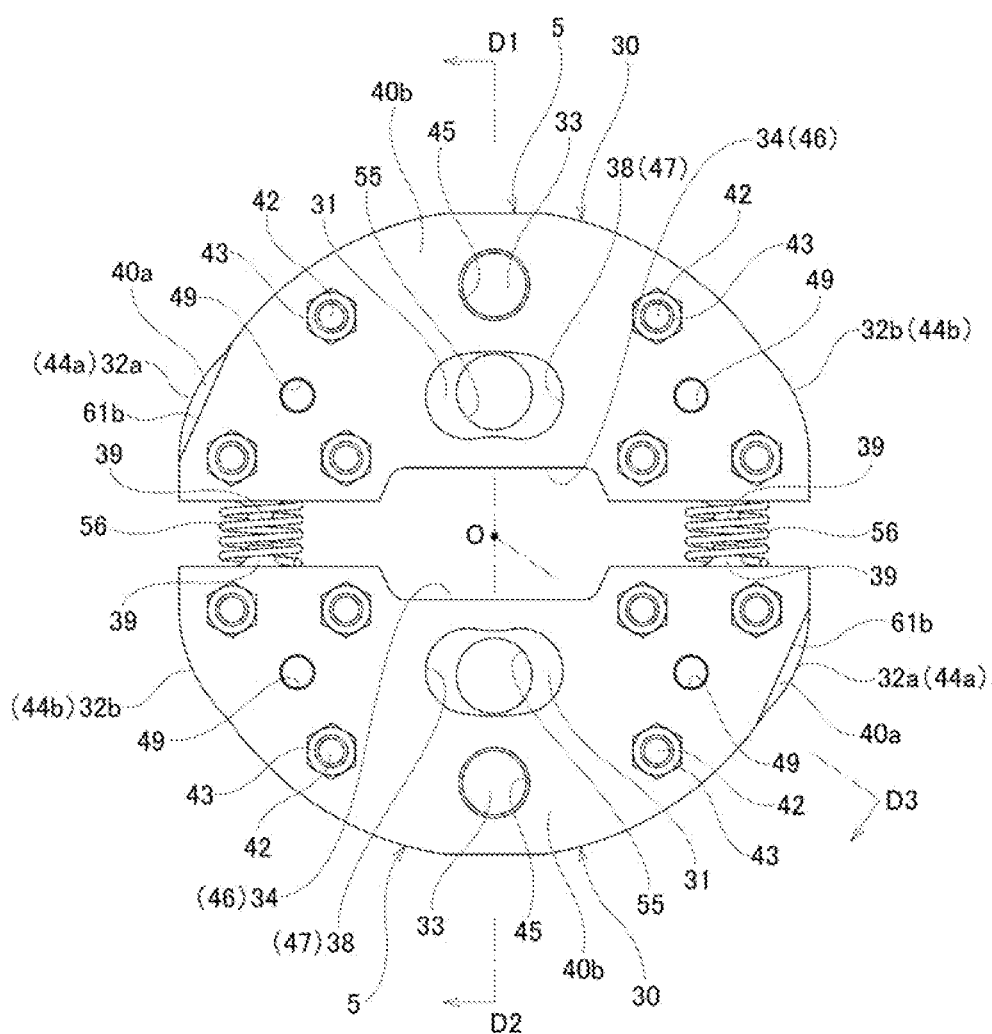
FIG. 14 is a view in the axial direction as seen from the output member side of the pair of engaging elements and springs of the reverse input blocking clutch of the first example.

The inner diameter dimension of the first hole 53 is set to be larger than the outer diameter dimension of the pivot support shaft 33, and the inner diameter dimension of the second hole 55 is larger than the outer diameter dimension of the input-side engaging portion 8. Furthermore, in this example, as illustrated in FIG. 5 and FIG. 8, for example, in a state in which the pair of pressing surfaces 32*a*, 32*b* of the engaging element 5 come in contact with the pressed surface 20, and the input-side engaging portion 8 is located in the central portion in the width direction of the engaging element main body 30, the distance Wa between the edges of the ends of the pivot support shaft 33 and the input-side engaging portion 8 that are on the far side from each other as illustrated in FIG. 10 is set to be equal to or less than the distance Wb between the edges of the ends of the first hole 53 and the second hole 55 that are on the far side from each other (Wa≤Wb), and preferably the distance Wa is set to be less than the distance Wb (Wa<Wb). Note that, from the aspect of facilitating the assembly of the reverse input blocking clutch 1, the difference Wb−Wa between the distances Wa and Wb is preferably as large as possible; however, on the other hand, as will be described later, from the aspect of being able to achieve an unlocked state by quickly moving the engaging element 5 inward in the radial direction when a rotational torque is inputted to the input member 2, it is desirable that the size be as small as possible.

(Pair of Springs 56)

A pair of springs 56 is arranged between both side portions in the width direction of the inner-side surfaces in the radial direction of the pair of engaging element main bodies 30 of the pair of engaging elements 5. In other words, the pair of springs 56 are arranged at positions separated from the output-side engaging portion 11 in the width direction of the engaging element main body 30 corresponding to the second direction. Each of the pair of springs 56 elastically biases each of the pair of engaging elements 5 in a direction outward in the radial direction, or in other words, in a direction that moves each of the pair of engaging elements 5 toward the pressed surface 20. As a result, in a neutral state in which torque is not applied to the input member 2 or the output member 3, the pressing surfaces 32*a*, 32*b* of the pair of engaging elements 5 are in contact with the pressed surface 20.

In this example, each of the pair of springs 56 is composed of coil springs, and by inserting the convex portions 39 of the pair of engaging elements 5 into the inner side of both side portions in the axial direction of the springs 56, each of the springs 56 is prevented from falling out from between the inner-side surfaces in the radial direction of the pair of engaging element main bodies 30.

Figure 15:
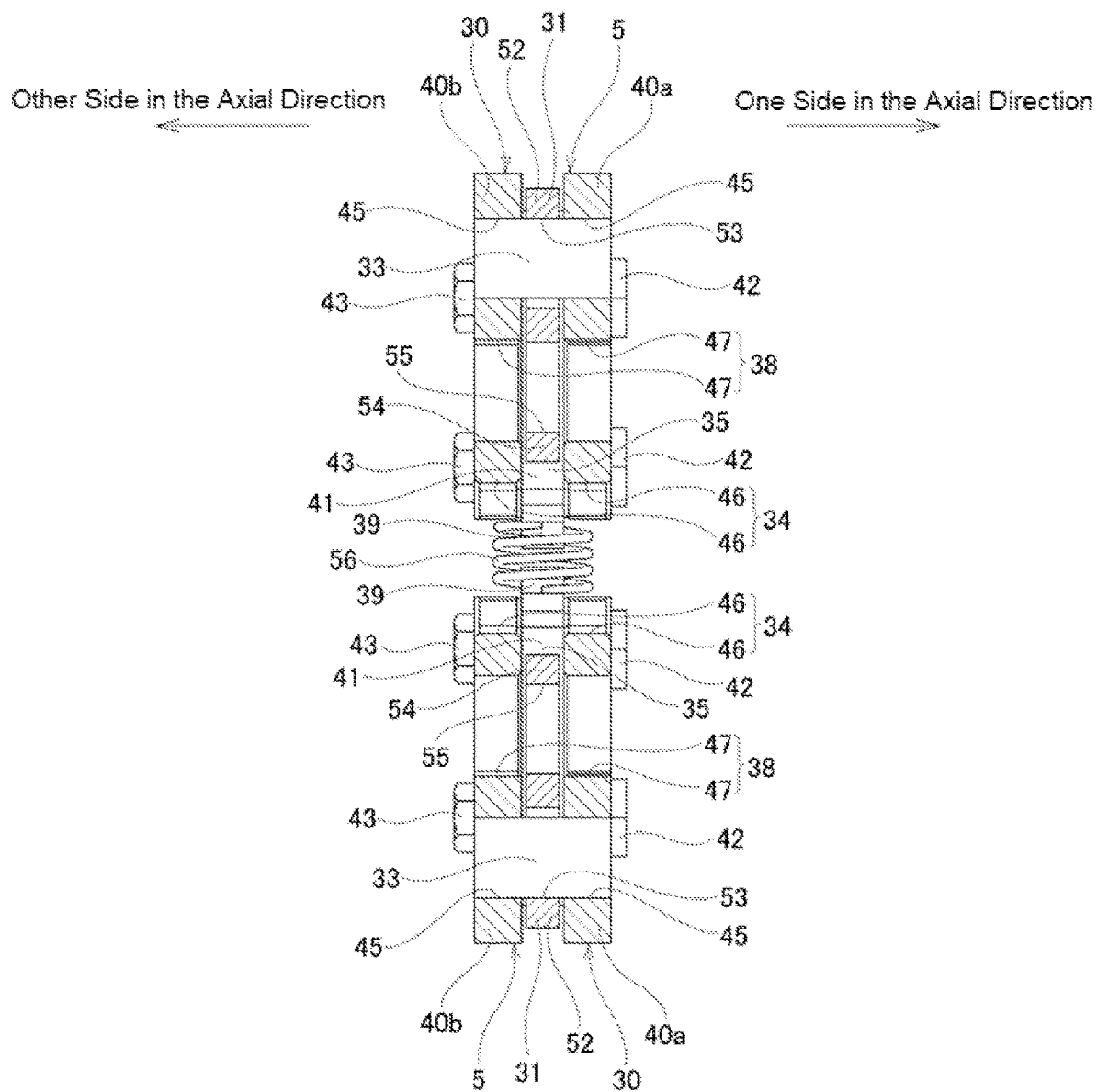
FIG. 15 is a cross-sectional view taken along section line D1-D2 of FIG. 14.
Figure 16:
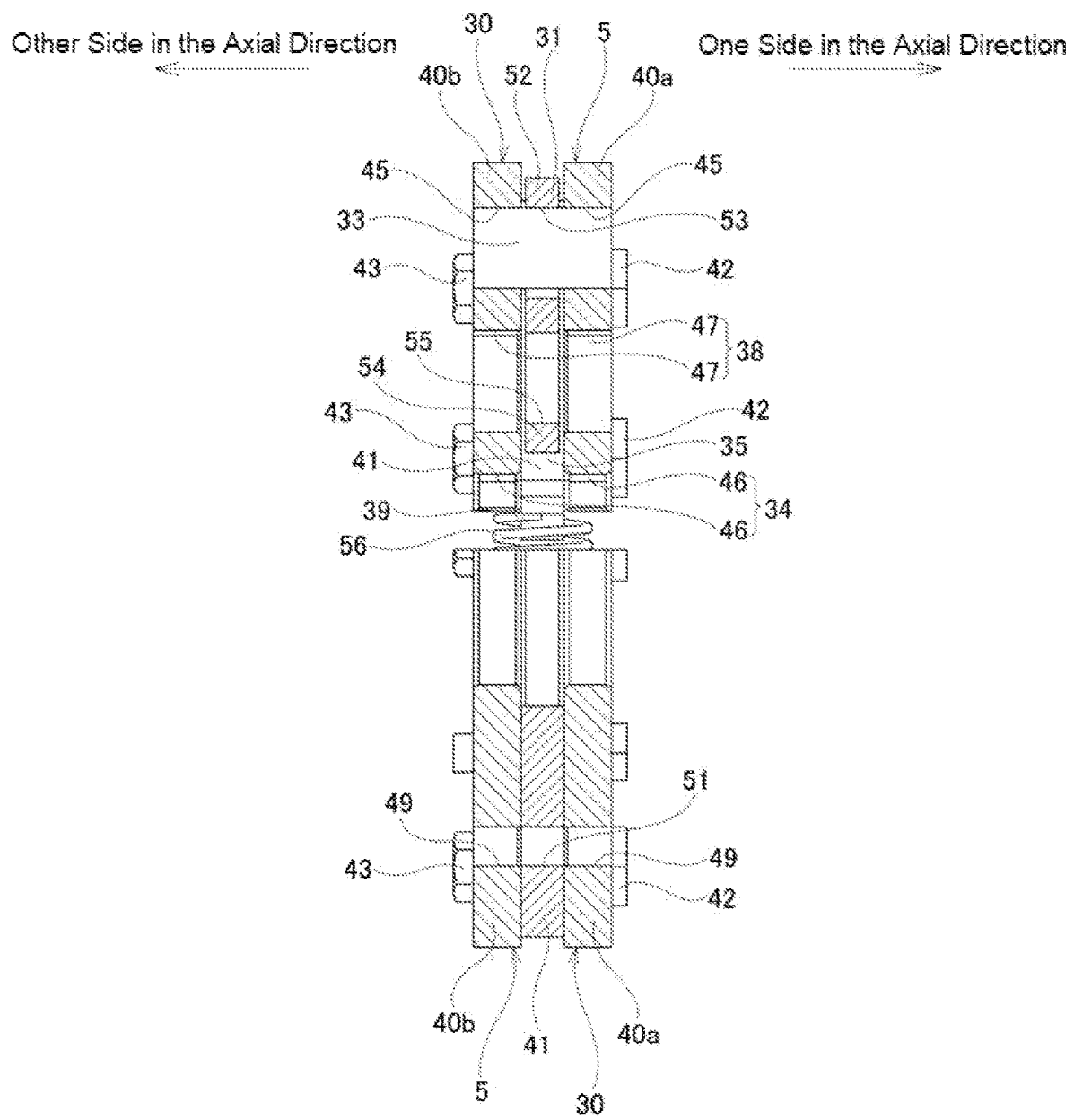
FIG. 16 is a is a cross-sectional view taken along section line D1-O-D3 of FIG. 14.
Figure 17:
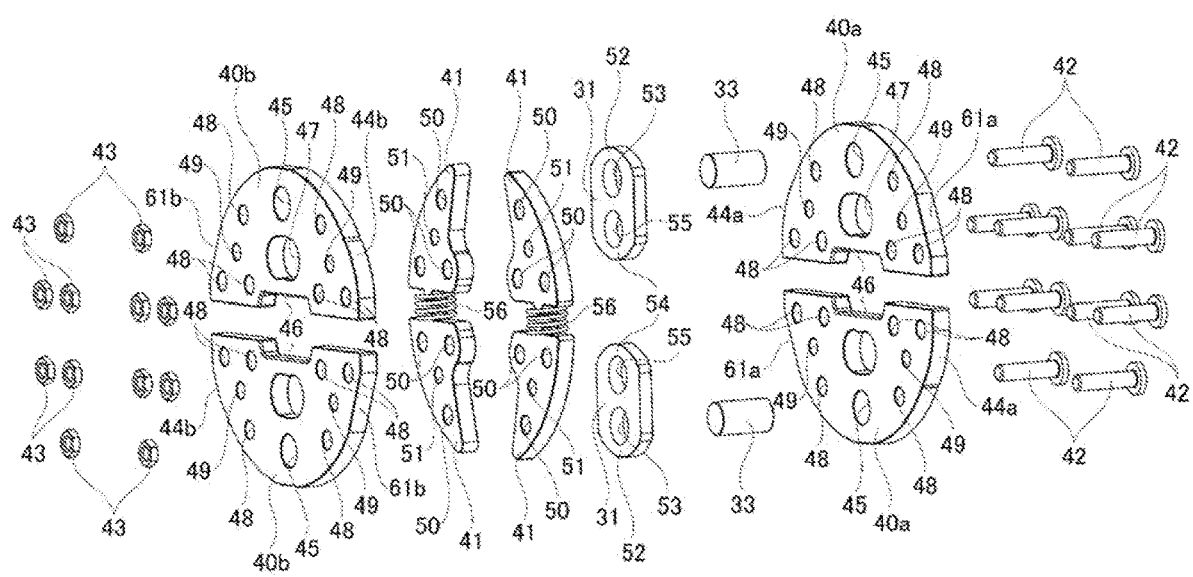
FIG. 17 is a perspective view of the pair of engaging elements of the reverse input blocking clutch of the first example.
Figure 18:
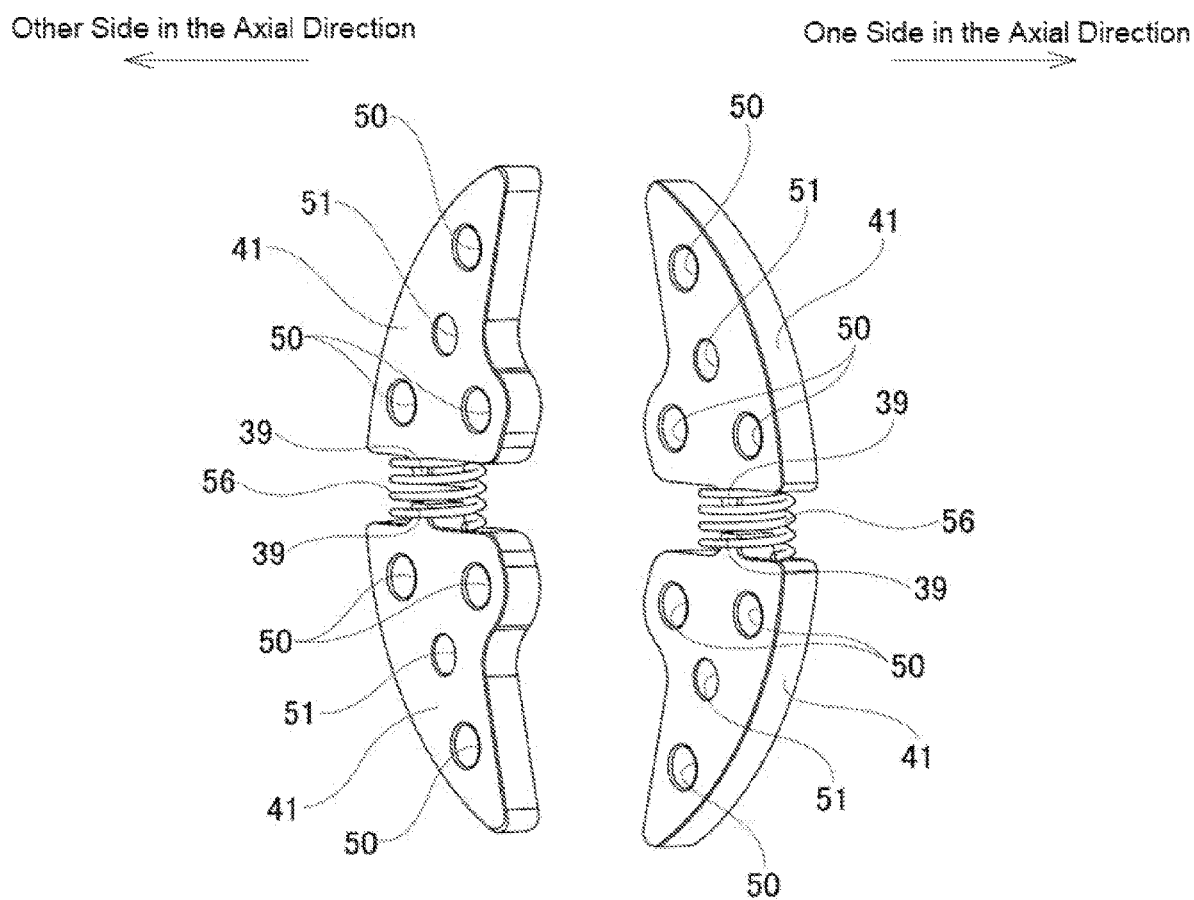
FIG. 18 is a perspective view of the intermediate plates and springs of the pair of engaging elements of the reverse input blocking clutch of the first example.
Figure 19:
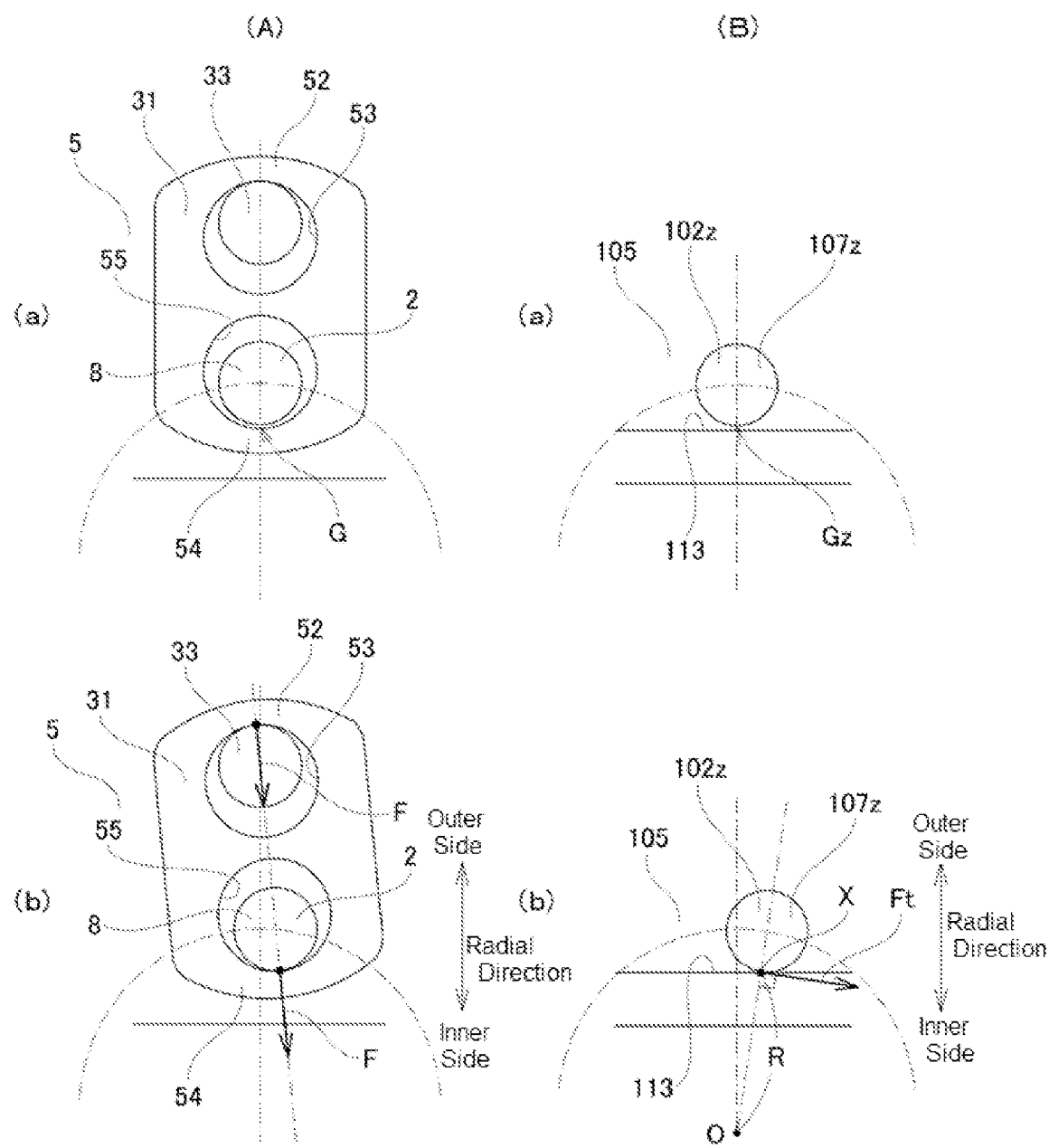
FIG. 19A (a) is a view illustrating the structure of the first example, and is a view of an engaging portion between the engaging element and the input-side engaging portion, and illustrates a state before a rotational torque is inputted to the input member.
FIG. 19B (a) is a view illustrating the structure of a comparative example that corresponds to a conventional structure, and is a view of the engaging portion between the engaging element and the input-side engaging portion, and illustrates a state before a rotational torque is inputted to the input member.
Figure 20:
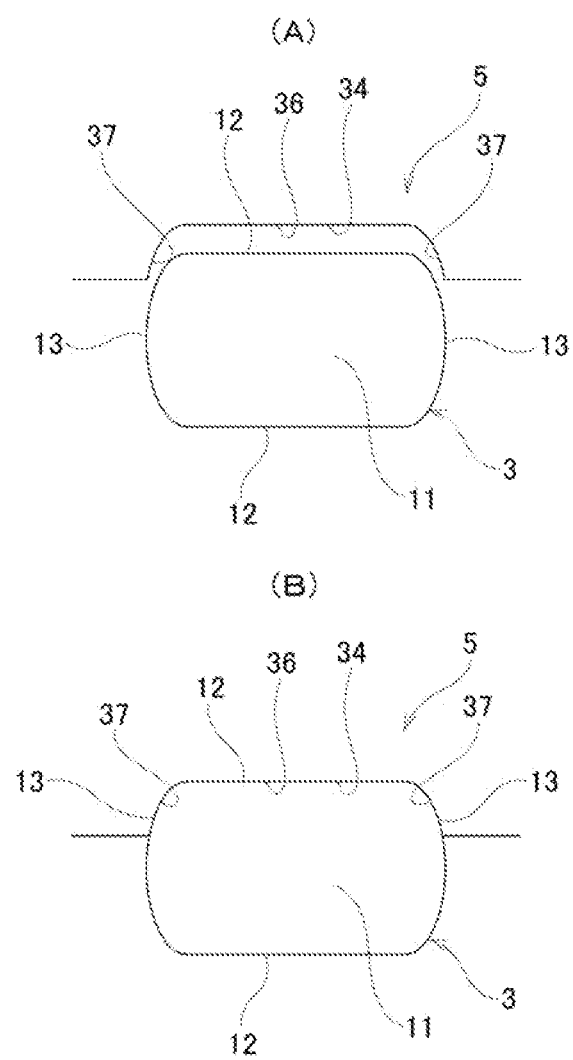
FIG. 20A and FIG. 20B are views of the reverse input blocking clutch of the first example, and are views illustrating states before and after engagement between the output-side engaging portion and the output-side engaged portion.

In this example, the outer diameter dimension of each of the pair of springs 56 is smaller than the thickness dimension in the axial direction of the engaging element main body 30. Therefore, as illustrated in FIGS. 15 and 16, for example, neither of the pair of springs 56 protrudes further on either side (outer side) in the axial direction than the side surfaces on both sides in the axial direction of the engaging element main body 30.

Note that the reason for keeping the pressing surfaces 32*a*, 32*b* of the pair of engaging elements 5 in contact with the pressed surface 20 in the neutral state as described above is so that a locked state may be realized quickly when a rotational torque is reversely inputted to the output member 3 as will be described later.

In the assembled state, the reverse input blocking clutch 1 of this example is such that the pair of input-side engaging portions 8 of the input member 2 that is arranged on the one side in the axial direction are inserted in the axial direction into the insertion holes 38 (through holes 47 of the pair of main body plates 40*a*, 40*b*) and the second holes 55 of the pair of engaging elements 5, and the output-side engaging portion 11 of the output member 3 arranged on the other is inserted in the axial direction between the output-side engaged portions 34 of the pair of engaging elements 5. In other words, the pair of engaging elements 5 are arranged so as to sandwich the output-side engaging portion 11 from the outer side in the radial direction by the respective output-side engaged portions 34.

[Explanation of the Operation of the Reverse Input Blocking Clutch]

As illustrated in FIG. 6, when a rotational torque is inputted to the input member 2 from the input-side mechanism, the input-side engaging portions 8 rotate in the rotational direction of the input member 2 (clockwise direction in the example in FIG. 6) on the inner side of the insertion holes 38 of the engaging element main bodies 30. Then, by the pivot support shaft 33 being pulled by the input-side engaging portion 8 via the link member 31 while the link member 31 pivots about the center of the pivot support shaft 33, each of the pair of engaging elements 5 move in a direction away from the pressed surface 20 (inner side in the radial direction). As a result, the pressing surfaces 32a, 32b of the pair of engaging elements 5 are separated from the pressed surface 20, the pair of output-side engaged portions 34 sandwich the output-side engaging portion 11 of the output member 3 from both sides in the radial direction, and the output-side engaging portion 11 and the pair of output-side engaged portions 34 engage with each other without looseness. As a result, the rotational torque inputted to the input member 2 is transmitted to the output member 3 via the pair of engaging elements 5, and is outputted from the output member 3.

In particular, in the structure of this example, when the engaging elements 5 move in a direction away from the pressed surface 20 (inward in the radial direction) as described above, as illustrated in FIG. 5 to FIG. 6 and FIG. 20A to FIG. 20B, the engaging elements 5 are restricted from moving in the width direction by a pair of guide surfaces 13 located on both sides in the major axis direction of the front half portion of the output-side engaging portion 11 guiding a pair of guided surfaces 37 located on both sides in the width direction of the output-side engaged portions 34. Then, as illustrated in FIG. 6 and FIG. 20B, the bottom surfaces 36 of the output-side engaged portions 34 come into surface contact with the side surfaces 12 of the output-side engaged portion 11, and the pair of guided surfaces 37 of the output-side engaged portions 34 come into surface contact with the pair of guide surfaces 13 of the output-side engaging portion 11. Therefore, in the structure of this example, it is possible to effectively prevent the engaging elements 5 from shifting in the width direction and coming into contact with the pressed surface 20 after the locked state or semi-locked state is released. In the structure of this example, guiding the movement of the engaging elements 5 inward in the radial direction as described above can be performed by using the output-side engaging portion 11, and thus the number of parts can be reduced as compared with a structure that incorporates another part used only for performing guidance.

Moreover, in the structure of this example, each pair of guided surfaces 37 of the output-side engaged portions 34 is composed of a pair of concave curved surfaces inclined in a direction in which the distance between the surfaces increases as going toward the inner side in the radial direction, and each pair of guide surfaces 13 of the output-side engaging portion 11 is composed of a pair of convex curved surfaces that match the pair of concave curved surfaces. Accordingly, as illustrated in FIG. 20A, in a state in which the engaging elements 5 are separated to the outer side in the radial direction from the output-side engaging portion 11, a gap is formed between the pair of guided surfaces 37 and the pair of guide surfaces 13, and the size of the gap (dimension in the width direction) increases toward the outer side in the radial direction. Therefore, in the structure of this example, in a state in which the engaging elements 5 are separated to the outer side in the radial direction from the output-side engaging portion 11, the movement of the engaging elements 5 in the width direction and the rotation direction can be appropriately allowed, and an unreasonable force can be effectively prevented from being applied to the engaging elements 5.

Figure 7:
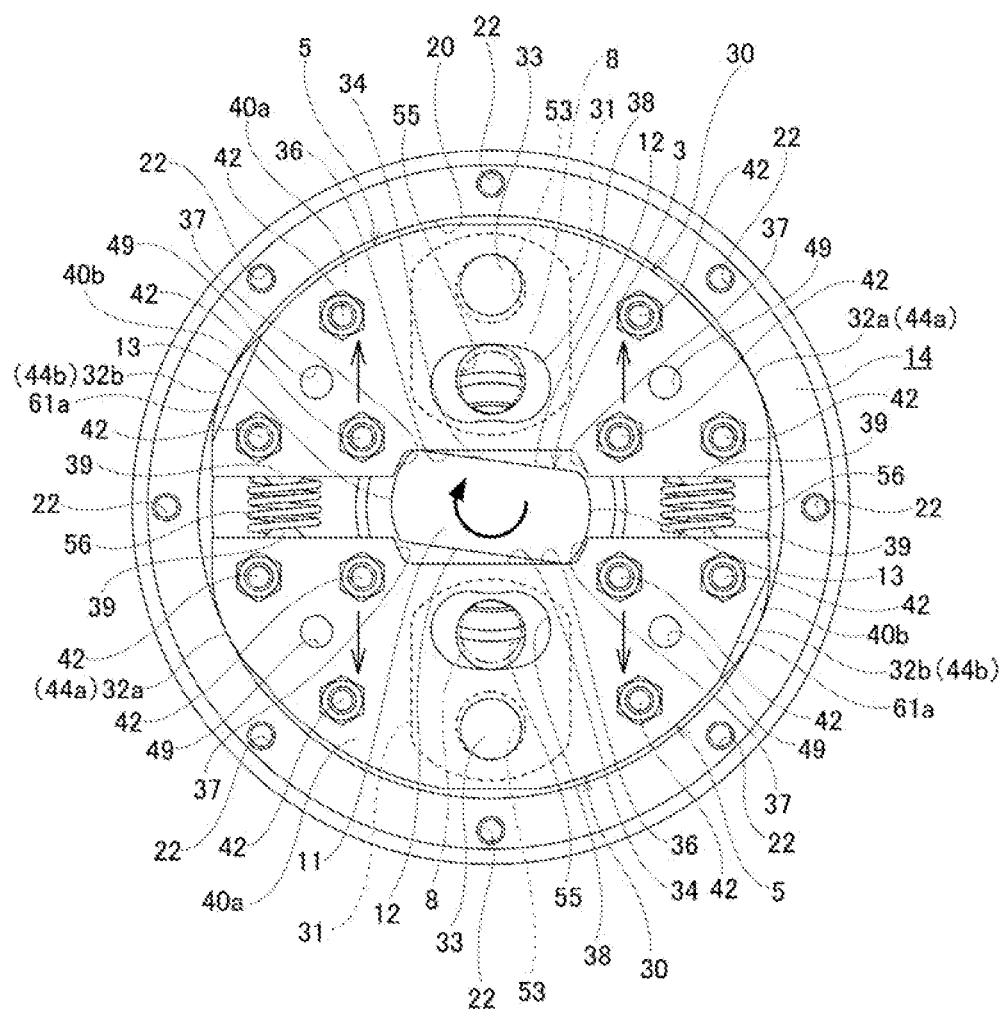
FIG. 7 is a view similar to FIG. 5 illustrating a state in which a rotational torque is reversely inputted to the output member.

On the other hand, as illustrated in FIG. 7, when a rotational torque is reversely inputted to the output member 3 from the output-side mechanism, the output-side engaging portion 11 rotates in the rotation direction of the output member 3 (clockwise in the example of FIG. 7) on the inner side of the pair of output-side engaged portions 34. Then, the corner portions, which are the connecting portions between the side surfaces 12 of the output-side engaging portion 11 and the guide surfaces 13, press the bottom surfaces 36 of the output-side engaged portions 34 outward in the radial direction, and each of the pair of engaging elements 5 is moved in a direction toward the pressed surface 20 (outer side in the radial direction). As a result, the pressing surfaces 32a, 32b of each of the pair of engaging elements 5 are pressed against the pressed surface 20, and each of the pressing surfaces 32a, 32b frictionally engages with the pressed surface 20. As a result, the rotational torque reversely inputted to the output member 3 is completely blocked by being transmitted to the housing 4 that is fixed to another member and is not transmitted to the input member 2, or only a part of the rotational torque reversely inputted to the output member 3 is transmitted to the input member 2, and the remaining part is blocked.

In order to completely block the rotational torque reversely inputted to the output member 3 so that no rotational torque is transmitted to the input member 2, the output member 3 is locked by tightly pressing the pair of engaging elements 5 between the output-side engaging portion 11 and the pressed surface 20 so that the pressing surfaces 32a, 32b do not slide (relatively rotate) with respect to the pressed surface 20. On the other hand, in order to transmit only a part of the rotational torque that is reversely inputted to the output member 3 to the input member 2 and block the remaining part, the output member 3 is semi-locked by pressing the pair of engaging elements 5 between the output-side engaging portion 11 and the pressed surface 20 so that the pressing surfaces 32a, 32b slide with respect to the pressed surface 20. When the output member 3 is in a semi-locked state and rotational torque is further reversely inputted to the output member 3, the pair of engaging elements 5 rotate about the center of rotation of the output member 3 while allowing the pressing surfaces 32a, 32b to slide with respect to the pressed surface 20 due to engagement between the output-side engaging portion 11 and the output-side engaged portions 34. When the pair of engaging elements 5 rotate, the input-side engaging portion 8 is pulled by the pivot support shaft 33 via the link member 31, and a part of the rotational torque is transmitted to the input member 2.

In the structure of this example such as described above, each of the pair of engaging elements 5 has pressing surfaces 32a, 32b at two locations separated from each other in the circumferential direction on the outer-side surface in the radial direction of the engaging element main bodies 30, and thus when rotational torque is reversely inputted to the output member 3, the frictional engagement force between the pressed surface 20 and the pressing surfaces 32a, 32b can be increased by a wedge effect.

Moreover, in the structure of this example, of the pair of pressing surfaces 32a, 32b provided in the engaging element main body 30, one pressing surface 32a is composed of only one convex surface 44a provided on the one main body plate 40a. Moreover, the other pressing surface 32b is composed of only one convex surface 44b provided on the other main body plate 40b. Therefore, with the structure of this example, the pair of pressing surfaces 32a, 32b can be more stably brought into contact with the pressed surface 20 compared with a structure in which each pair of pressing surfaces is provided on each pair of main body plates and is composed of two convex surfaces arranged apart from each other in the axial direction (hereinafter referred to as the "structure of the first comparative example").

In other words, in the structure of the first comparative example, each of the pair of pressing surfaces is provided on each pair of main body plates, and is composed of two convex surfaces arranged apart from each other in the axial direction, and thus not only the processing error of each of the convex surfaces, but also the assembly error caused by superimposing the pair of main body plates affects the accuracy of the pressing surfaces. On the other hand, in the structure of this example, the pressing surface 32a (32b) is composed of only one convex surface 44a (44b). Therefore, it is possible to prevent the assembly error from affecting the accuracy of the pressing surface 32a (32b).

Moreover, of the outer-side surface in the radial direction of the engaging element main body 30, the convex surfaces 44a, 44b forming the pressing surfaces 32a, 32b require higher processing accuracy than the other portions. In this example, the number of convex surfaces 44a, 44b can be reduced (can be halved) as compared with the structure of the first comparative example, and thus it is possible to suppress the manufacturing cost of the engaging element main body 30.

Furthermore, as a structure different from this example, a structure is possible in which the engaging element main body is composed of one main body plate and a pivot support shaft, the end portion in the axial direction of which is supported by the one main body plate in a cantilever form, and each of both side portions in the circumferential direction of the outer-side surface in the radial direction of the one main body plate has a convex surface that forms a pressing surface (hereinafter, referred to as the "structure of the second comparative example"). The structure of this kind of second comparative example is common to the structure of the present example in that each of the pair of pressing surfaces is composed of only one convex surface. However, in the structure of the second comparative example, the pivot support shaft is supported by the main body plate in a cantilever form, and thus when the pivot support shaft is pulled inward in the radial direction by the input-side engaging portion via the link member, due to the moment applied to the one main body plate, the one main body plate tends to fall toward the link member side in the axial direction, and there is a possibility that the operation may become unstable. On the other hand, in the structure of the present example, the end portions on both sides in the axial direction of the pivot support shaft 33 are supported by a pair of main body plates 40a, 40b, and thus when the input-side engaging portion 8 pulls an intermediate portion in the axial direction of the pivot support shaft 33 inward in the radial direction via the link member 31, the moments applied to the pair of main body plates 40a, 40b cancel each other out, so it is possible to prevent the pair of main body plates 40a, 40b from falling in the axial direction, and operation may be stabilized.

Moreover, in the structure of this example, the pair of main body plates 40a, 40b use parts having the same shape and size as each other, and thus the types of parts of the engaging element main body 30 can be reduced, and the manufacturing cost of the engaging element main body 30 can be suppressed.

Furthermore, according to the reverse input blocking clutch 1 of this example, it is possible to smoothly switch from the locked or semi-locked state to the unlocked state when rotational torque is inputted to the input member 2. This aspect will be described with reference to FIGS. 19A and 19B.

FIGS. 19A (a) and 19A (b) illustrate the mutual positional relation between a part of the input member 2 and a part of an engaging element 5 in the structure of this example. More specifically, FIG. 19A (a) illustrates the positional relation in a state in which the input-side engaging portion 8 is located at the central portion in the width direction of the engaging element 5, and the link member 31 is closest to the inner side in the radial direction in the locked state or semi-locked state illustrated in FIG. 7. FIG. 19A (b) illustrates the positional relation in a state in which when rotational torque T is inputted to the input member 2 from the state illustrated in FIG. 19A (a), the input-side engaging portion 8 rotates in the rotational direction of the input member 2 (clockwise in the illustrated example), and a translational load F begins to act on the pivot support shaft 33 from the input-side engaging portion 8 via the link member 31.

On the other hand, FIG. 19B (a) and FIG. 19B (b) illustrate the mutual positional relation between a part of the input member 102z and a part of the engaging element 105 of a structure having the same configuration as the conventional structure described above except that the shape of the input-side engaging portion 107z of the input member 102z is cylindrical (hereinafter referred to as "the structure of the third comparative example"). More specifically, FIG. 19B (a) illustrates the positional relation in a state where the input-side engaging portion 107z is located in the central portion in the width direction of the engaging element 105 in the locked state or semi-locked state. FIG. 19B (b) illustrates the positional relation in a state in which, when rotational torque T is inputted to the input member 102z from the state illustrated in FIG. 19B (a), the input-side engaging portion 107z rotates in the rotational direction of the input member 102z (clockwise in the illustrated example), the input-side engaging portion 107z comes in contact with the input-side engaged portion 113 of the engaging element 105, and a translational load Ft due to the rotational torque T begins to act on the contact portion X between the input-side engaging portion 107z and the input-side engaged portion 113.

In the structure of the third comparative example, as illustrated in FIG. 19B (b), the direction of the translational load Ft, in other words, the direction of the load acting on the engaging element 105 from the input member 102z, is the direction in which the engaging element 105 should move when switching from the locked state or semi-locked state to the unlocked state, and is greatly inclined in the radial direction of the engaging element 105 (the far and near direction of the engaging element 105 with respect to the pressed surface).

On the other hand, in the structure of this example, as illustrated in FIG. 19A (b), the direction of the translational load F, or in other words, the direction of the load acting on the engaging element 5 from the input member 2, is the direction in which the engaging element 5 should move when switching from the locked state or semi-locked state to the unlocked state, and is the direction substantially parallel to the radial direction of the engaging element 5 (the far and near direction of the engaging element 5 with respect to the pressed surface 20). In other words, the angle between the direction of the translational load F and the direction in which the engaging element 5 should move is less than the angle between the direction of the translational load Ft and the direction in which the engaging element 105 should move in the structure of the third comparative example. That is, in the structure of this example, the rotational torque T inputted to the input member 2 can be efficiently converted into a load for moving the engaging element 5 inward in the radial direction. Therefore, with the structure of this example, it is possible to smoothly switch from the locked state or semi-locked state to the unlocked state when rotational torque is inputted to the input member 2.

Note that from the aspect of ease of assembly of the reverse input blocking clutch, preferably the size of the gap G (difference Wb−Wa described above) existing between the inner-side surface in the radial direction of the input-side engaging portion 8 and the inner circumferential surface of the second hole 55 of the link member 31 in the state illustrated in FIG. 19A (a) in the structure of this example, and the size of the gap Gz existing between the inner-side surface in the radial direction of the input-side engaging portion 107z and the input-side engaged portion 113 in the state illustrated in FIG. 19B (a) in the structure of the third comparative example are both as large as possible; however, from the aspect of being able to achieve an unlocked state by quickly moving the engaging elements 5, 105 inward in the radial direction when a rotational torque is inputted to the input member 2, 102z, preferably the sizes are as small as possible. Therefore, in the manufacture of the reverse input blocking clutch, it is necessary to adjust the sizes of the gaps G and Gz to appropriate sizes in consideration of these circumstances.

In the structure of the third comparative example, in order to adjust the size of the gap Gz, it may be necessary that the portion of the input-side engaged portion 113 that comes into contact with the inner-side surface in the radial direction of the input-side engaging portion 107z be machined to finish with high precision, and in this case the cost is expected to increase. On the other hand, in the structure of this example, the size of the gap G can be adjusted only by managing the distance between the centers of the first hole 53 and the second hole 55 of the link member 31, and since the member 31 can be manufactured by inexpensive press working, it is easy to suppress the cost.

Second Example

A second example of an embodiment of the present invention will be described with reference to FIGS. 21 to 24.

In this example, the structure for holding the spring (coil spring) 56a by the engaging element 5a is different from that in the first example. In other words, in this example, the engaging element main body 30a of the engaging element 5a has a concave portion 62 into which the end portion of the spring 56a is inserted for holding the spring 56a. In particular, in this example, the intermediate plate 41a of the engaging element main body 30a has a concave portion 62.

Figure 21:
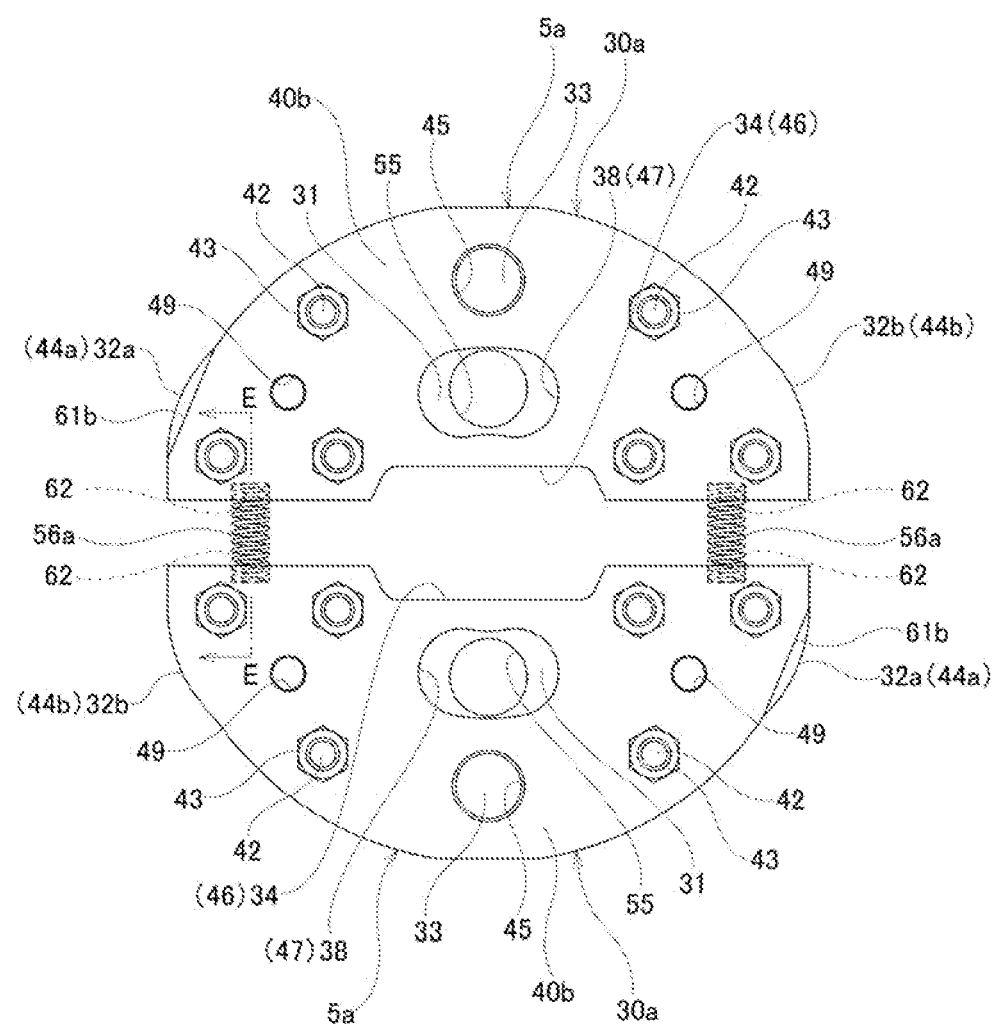
FIG. 21 is a view of a pair of engaging elements and springs of a reverse input blocking clutch of a second example of an embodiment of the present invention, and corresponds to FIG. 14.
Figure 22:
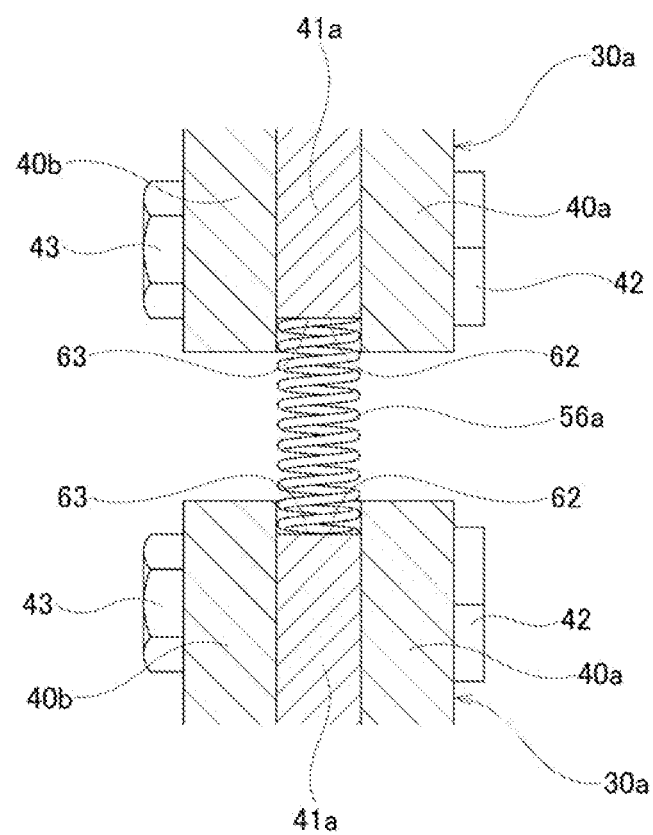
FIG. 22 is a cross-sectional view taken along section line E-E of FIG. 21.
Figure 23:
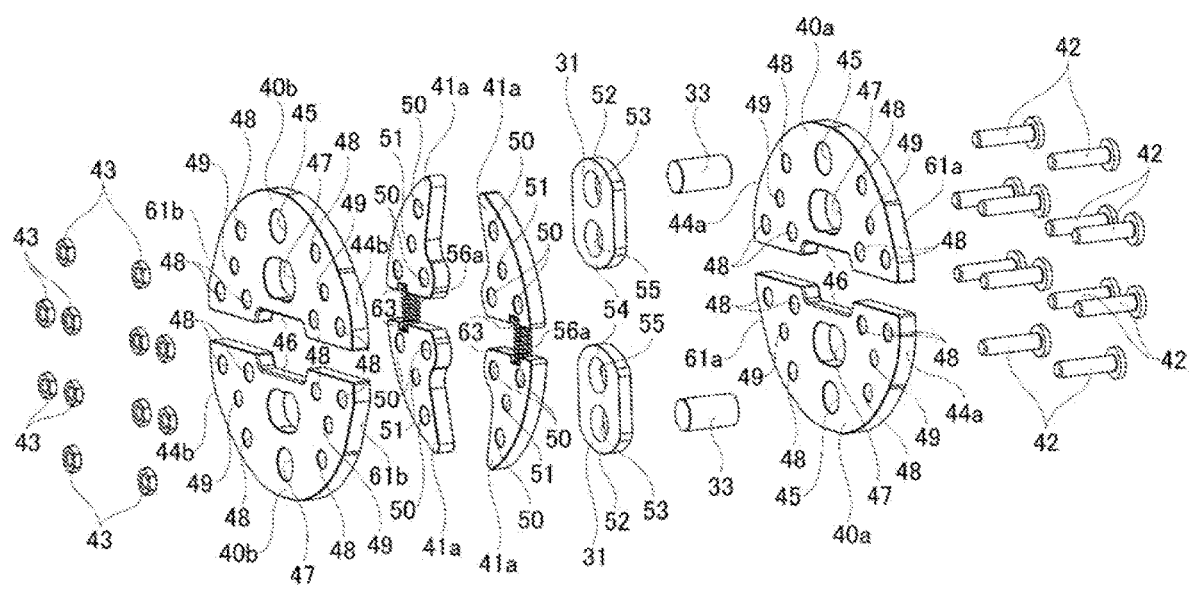
FIG. 23 is a perspective view of the pair of engaging elements and springs of the reverse input blocking clutch of the second example.
Figure 24:
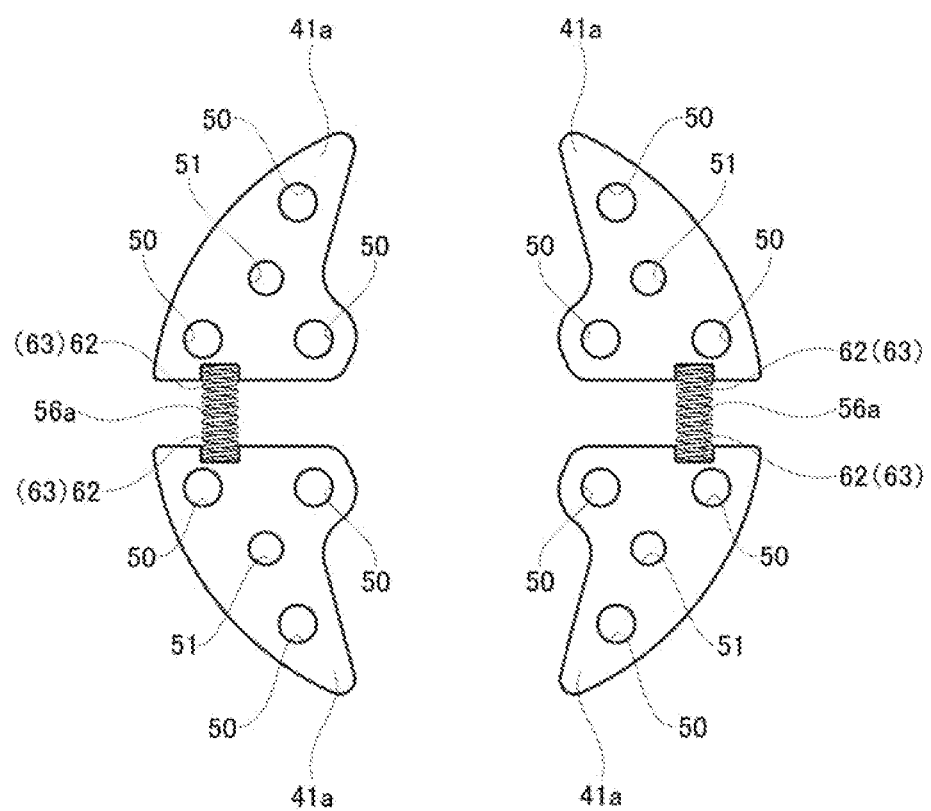
FIG. 24 is a front view of the intermediate plates and springs of the pair of engaging elements of the reverse input blocking clutch of the second example.

To explain this more specifically, the engaging element main body 30a has concave portions 62 that are recessed toward the outer side in the radial direction in the central portions in the thickness direction (axial direction of the pressed surface 20 (refer to FIG. 5), and front-back direction in FIG. 21, and the left-right direction in FIG. 22) in both side portions in the width direction of the inner-side surface in the radial direction. The concave portion 62 is formed by a rectangular notch 63 provided in an intermediate portion in the width direction of the end portion on the inner side in the radial direction of the intermediate plate 41a of the engaging element main body 30a. As illustrated in FIG. 22, the notch 63 of the concave portion 62 is arranged at a position in the thickness direction of the engaging element main body 30a that is sandwiched between the end portions on the inner side in the radial direction of the pair of main body plate 40a, 40b of the engaging element main body 30a. In other words, the opening portions on both sides in the axial direction of the notch 63 of the concave portion 62 are closed by the end portions on the inner side in the radial direction of the pair of main body plates 40a, 40b. Therefore, in the structure of this example, the concave portion 62 formed by the notch 63 opens only inward in the radial direction of the engaging element main body 30a.

In the assembled state of the reverse input blocking clutch, the end portions on both sides in the axial direction of the pair of springs 56a are inserted into concave portions 62 in the pair of engaging element main bodies 30 that face each other, and the springs 56a are held in these concave portions 62. As a result, the pair of springs 56a is prevented from falling out in the width direction and in the axial direction of the pressed surface 20 from between the inner-side surfaces in the radial direction of the pair of engaging element main bodies 30a. Note that the end portions in the axial direction of the springs 56a may be inserted (press-fitted) in the concave portions 62 with interference, or may be inserted (inserted through a small gap) in the concave portions 62 without interference. It should also be noted that in a case of implementing the present invention, the concave portions into which the end portions in the axial direction of the springs (coil springs) are inserted may be formed so as to be open only in an intermediate portion in the thickness direction on the inner-side surfaces in the radial direction of the intermediate plates.

In the structure of this example, unlike the structure of the first example, there are no convex portions on the inner-side surfaces in the radial direction of the pair of engaging element main bodies 30a for holding the springs. Therefore, the inner-side surfaces in the radial direction of the pair of engaging element main bodies 30a may be brought close together to shorten the distance between the inner-side surfaces in the radial direction of the pair of engaging element main bodies 30a. Therefore, it becomes easy to reduce the size in the radial direction of the reverse input blocking clutch. The other construction and operational effects are the same as in the first example.

Modified Examples

Note that in a case of implementing the present invention, as a modified example of the first and second examples, it is possible to use other connecting means such as rivets, welding, adhesives, crimping, or the like as connecting means for connecting the input-side housing element and the output-side housing element of the housing, or as connecting means for connecting the pair of main body plates and the pair of intermediate plates of the engaging element main body. Moreover, as other such connecting means, it is possible to use a connecting means in which the intermediate portion in the axial direction of a connecting shaft is inserted into a through hole formed at the position where a plurality of parts to be connected to each other are aligned with each other, fastening retaining rings at both end portions of the connecting shaft in the axial direction, and the plurality of parts are sandwiched by these retaining rings from both sides in the axial direction.

Moreover, as a modified example of the first example and the second example, for example, one intermediate plate of the pair of intermediate plates may be integrally formed with one of the main body plates of the pair of main body plates, and the other intermediate plate of the pair of intermediate plates may be integrally formed with the other main body plate of the pair of main body plates. Alternatively, each of the pair of intermediate plates may be integrally formed on one of the main body plates of the pair of main body plates. By adopting these configurations, the engaging element main body may be configured by a combination of a pair of main body plates, and the number of parts can be reduced.

Figure 25:
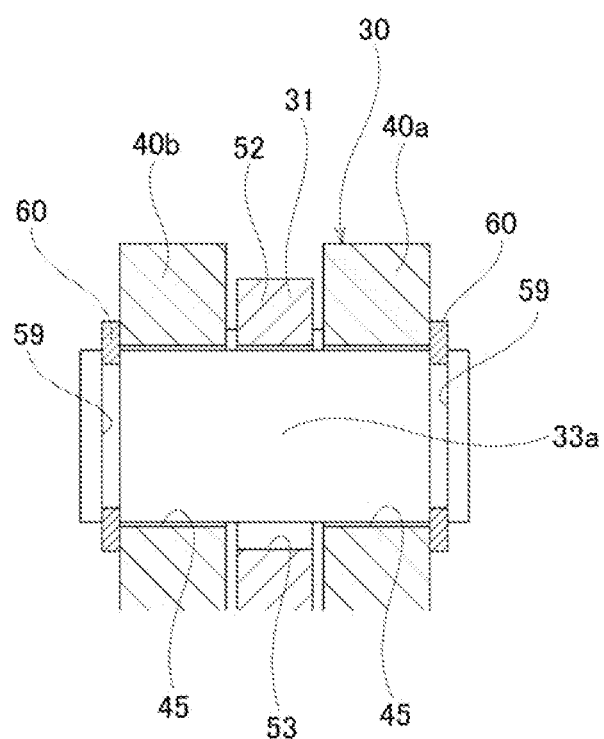
FIG. 25 illustrates a modified example of the first example and the second example, and is a view corresponding to the upper-end portion in FIG. 15.
Figure 26:
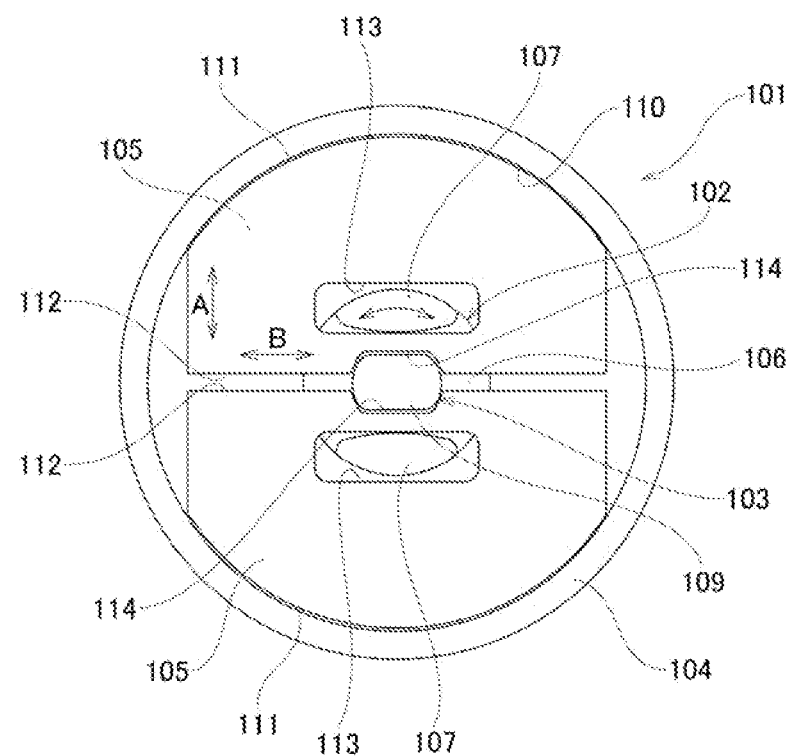
FIG. 26 illustrates a conventional reverse input blocking clutch.
Figure 27:
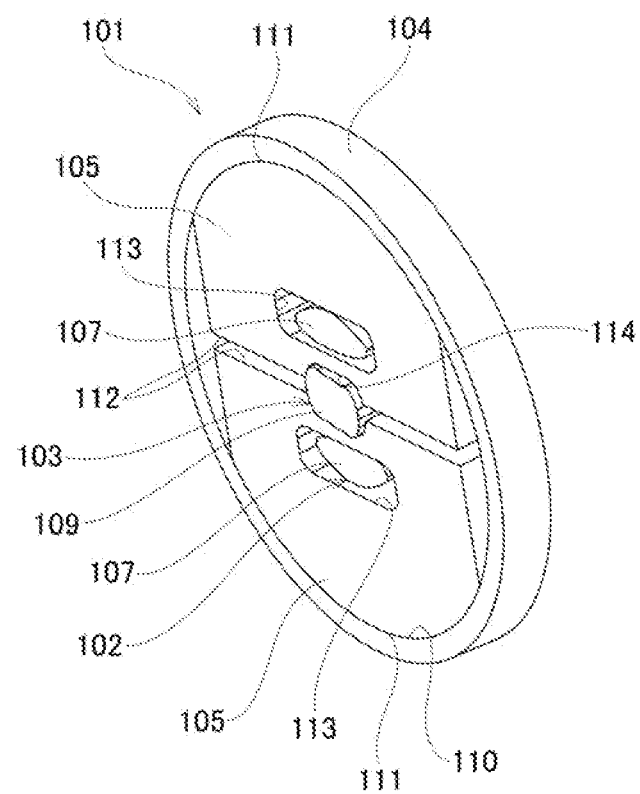
FIG. 27 is a perspective view of the conventional reverse input blocking clutch.
Figure 28:
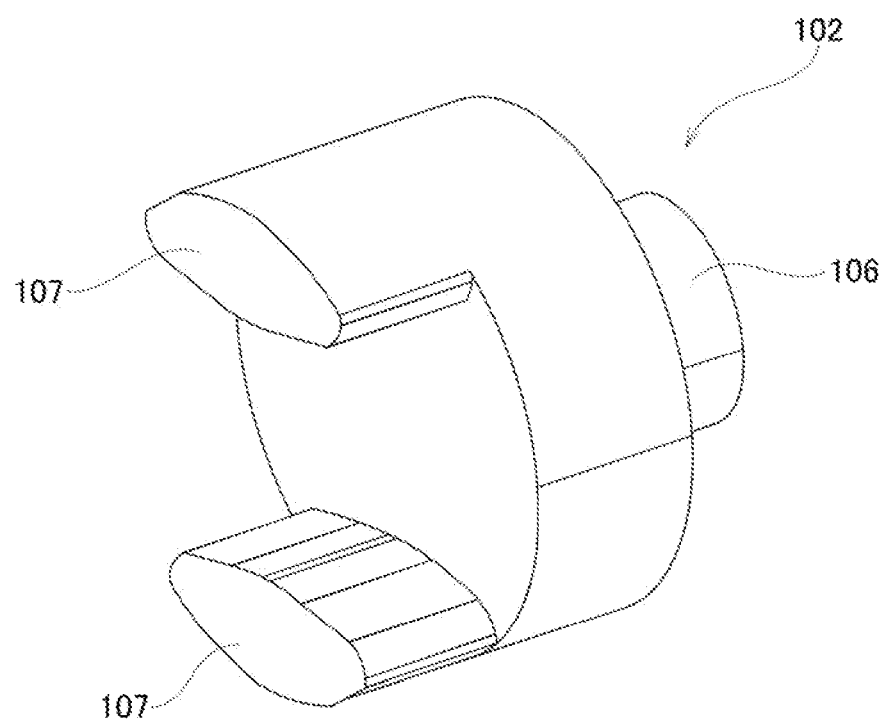
FIG. 28 is a perspective view illustrating a part of an input member of the conventional reverse input blocking clutch.
Figure 29:
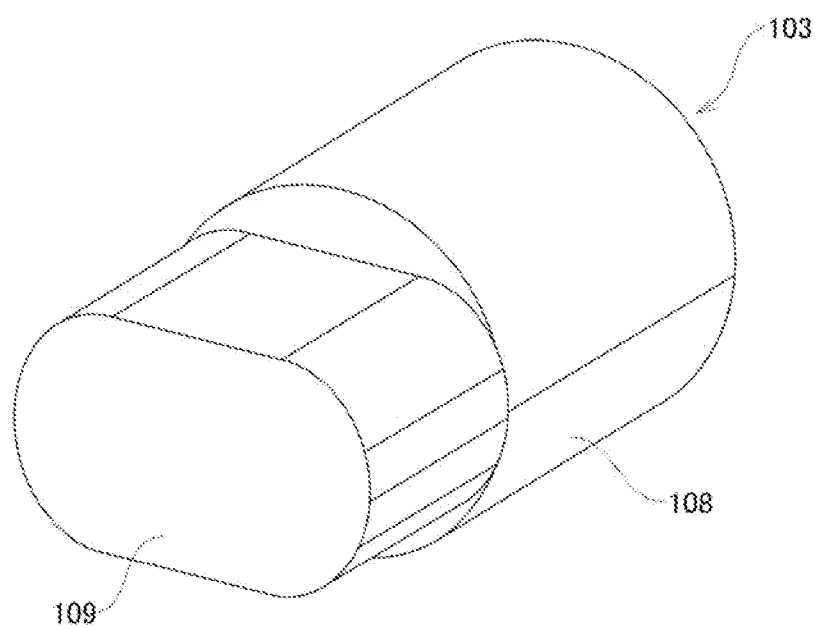
FIG. 29 is a perspective view illustrating a part of an output member of the conventional reverse input blocking clutch.
Figure 30:
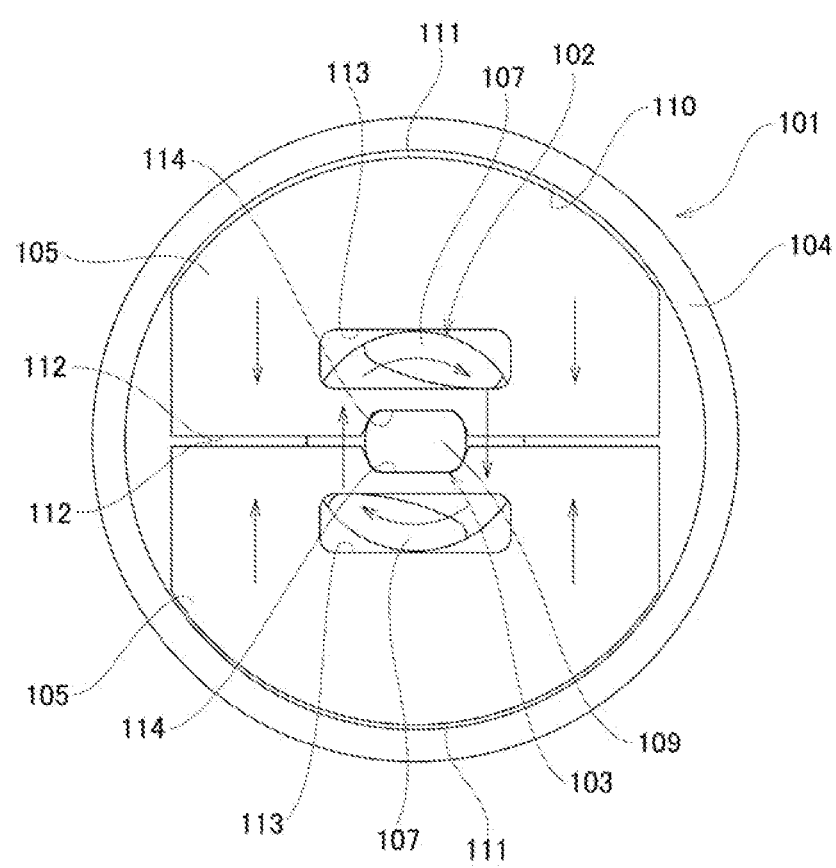
FIG. 30 illustrates the conventional reverse input blocking clutch, and illustrates a state in which a rotational torque is inputted to the input member.
Figure 31:
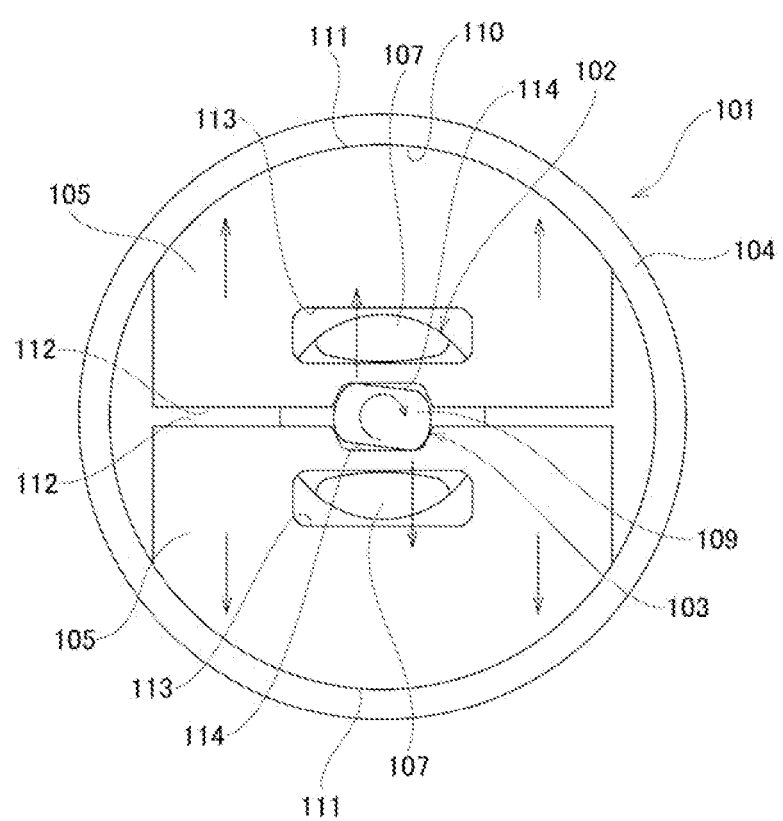
FIG. 31 illustrates the conventional reverse input blocking clutch, and illustrates a state in which a rotational torque is reversely inputted to the output member.
Figure 32:
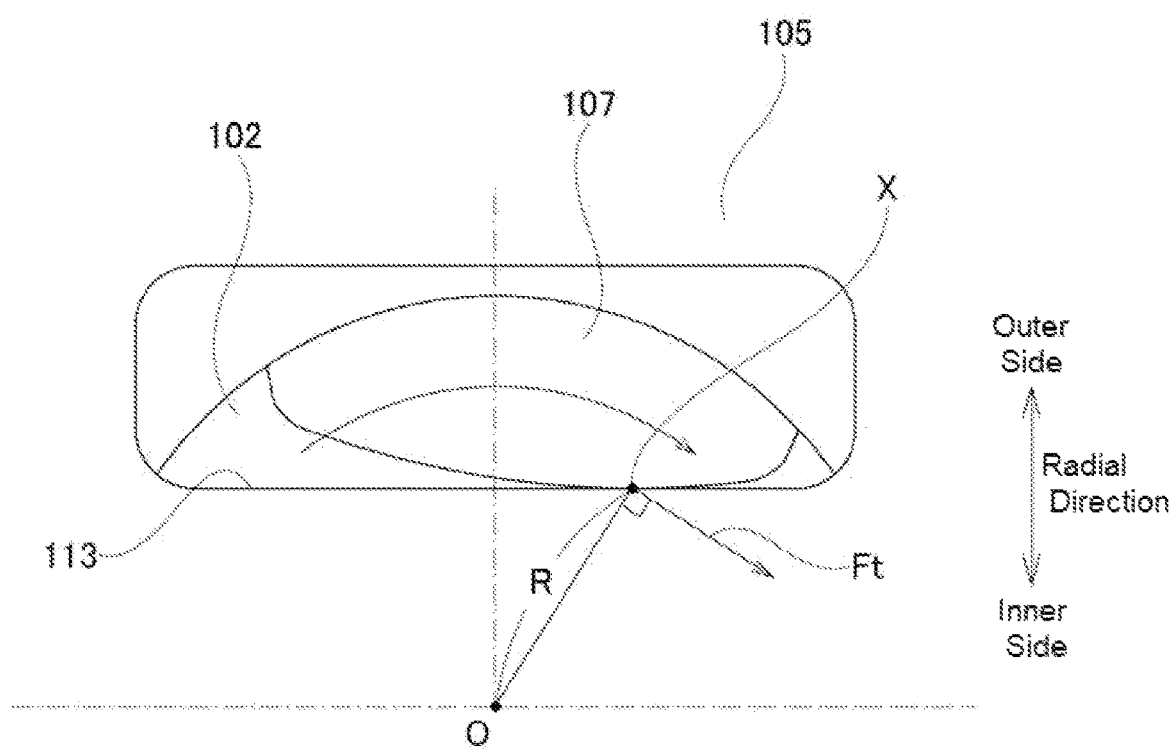
FIG. 32 is a partially enlarged view of FIG. 30.

Moreover, as a modified example of the first example and the second example, a configuration as illustrated in FIG. 25 can be adopted. In this modified example, the portions near both ends in the axial direction of the pivot support shaft 33*a* are inserted into the support holes 45 in the pair of main body plates 40*a*, 40*b* without interference, retaining rings 60 are fastened to fastening grooves 59 that are provided in the outer circumferential surface of both end portions in the axial direction of the pivot support shaft 33*a*, and the pair of main body plates 40*a*, 40*b* are lightly sandwiched from both sides in the axial direction by these retaining rings 60. In this state, the pivot support shaft 33*a* can rotate about the central axis of the pivot support shaft 33*a* with respect to the pair of main body plates 40*a*, 40*b*. With this kind of configuration, the link member 31 can be pivotally moved together with the pivot support shaft 33*a* with respect to the engaging element main body 30, or in other words, the link member 31 can be pivotally moved more smoothly, and thus the operation when a rotational torque is applied to the input member can be performed more smoothly. Note that by pivotally moving the link member 31 more smoothly, it is possible to adopt a configuration in which the pivot support shaft (pin) is rotatably supported by a bearing so as to be able to rotate about the center axis of the pivot support shaft with respect to the main body plate, or it is possible to adopt a configuration in which the input-side engaging portion (pin) is rotatably supported by a bearing so as to be able to rotate about the center axis of the input-side engaging portion with respect to the input-shaft portion of the input member.

Furthermore, in a case of implementing the present invention, as the springs for elastically biasing the pair of engaging elements toward the pressed surface, it is possible to adopt other kinds of springs such as leaf springs or the like instead of the coil springs in the first and second examples. The springs that elastically bias the pair of engaging elements toward the pressed surface may be arranged so as to be sandwiched between the pair of engaging elements, or may also be arranged so as to be sandwiched between an engaging element and another member (for example, the output member).

In the first example and the second example, a pair of engaging elements are provided as the engaging element; however, as long as the structure is such that allows the engaging element to move away from or toward the pressed surface, it is possible to adopt a structure in which one engaging element is provided, and that one engaging element is combined with one input-side engaging portion. Moreover, it is also possible to adopt a structure in which three or more engaging elements are provided, and these engaging elements are combined with corresponding input-side engaging portions. These structures are also included within the range of the present invention.

The configurations of the first example and the second example (including these modified examples and alternative examples) of the above-described embodiments of the present invention can be implemented in appropriate combinations as long as there is no contradiction.

Note that a configuration in which the pair of guide surfaces of the output-side engaging portion and the pair of guided surfaces of the output-side engaged portion in the present invention is also applicable to the conventional reverse input blocking clutch described above.

REFERENCE SIGNS LIST

1 Reverse input blocking clutch
2 Input member
3 Output member
4 Housing
5, 5*a* Engaging element
6 Input-shaft portion
7 Input arm portion
8 Input-side engaging portion
9 Support hole
10 Output shaft portion
11 Output-side engaging portion
12 Side surface
13 Guide surface
14 Output-side housing element
15 Input-side housing element
16 Bolt
17 Outer-diameter side cylinder portion
18 Inner-diameter side cylinder portion
19 Side plate portion
20 Pressed surface
21 Output-side in-row fitting surface
22 Screw hole
23 Output-side bearing fitting surface
24 Outer-diameter side cylinder portion
25 Inner-diameter side cylinder portion
26 Side plate portion
27 Input-side in-row fitting surface
28 Through hole
29 Input-side bearing fitting surface
30, 30*a* Engaging element main body
31 Link member
32*a*, 32*b* Pressing surface
33, 33*a* Pivot support shaft
34 Output-side engaged portion
35 Internal space
36 Bottom surface
37 Guided surface
38 Insertion hole
39 Convex portion
40*a*, 40*b* Main body plate
41, 41*a* Intermediate plate
42 Bolt
43 Nut
44*a*, 44*b* Convex surface
45 Support hole
46 Concave portion
47 Through hole
48 Through hole
49 Positioning hole
50 Through hole
51 Positioning hole
52 First end portion
53 First hole
54 Second end portion
55 Second hole
56, 56*a* Spring
57 Input-side bearing 58 Output-side bearing
59 Fastening groove
60 Retaining ring
61a, 61b Retracting surface
62 Concave portion
63 Notch
101 Reverse input blocking clutch
102, 102z Input member
103 Output member
104 Pressed member
105 Engaging element
106 Input-shaft portion
107, 107z Input-side engaging portion
108 Output shaft portion
109 Output-side engaging portion
110 Pressed surface
111 Pressing surface
112 Bottom surface
113 Input-side engaged portion
114 Output-side engaged portion

The invention claimed is:

1. A reverse input blocking clutch comprising:
a pressed member having a pressed surface on an inner circumferential surface thereof;
an input member having an input-side engaging portion arranged on an inner side in a radial direction of the pressed surface, the input member being coaxially arranged with the pressed surface;
an output member having an output-side engaging portion arranged further on the inner side in the radial direction than the input-side engaging portion on the inner side in the radial direction of the pressed surface, the output member being coaxially arranged with the pressed surface; and
an engaging element having an engaging element main body and a link member, and arranged on the inner side in the radial direction of the pressed surface so as to be able to move in a first direction away from or toward the pressed surface;
wherein
the engaging element main body comprises: a pair of main body plates that are connected together and arranged so as to overlap with each other in an axial direction of the pressed surface; and a pivot support shaft that is arranged on a side in the first direction closer to the pressed surface than the input-side engaging portion, and that has both side portions in the axial direction supported by the pair of main body plates;
the pair of main body plates has a pair of pressing surfaces facing the pressed surface and arranged on both side portions in a second direction orthogonal to the first direction and the axial direction of the pressed surface, and an output-side engaged portion that engages with the output-side engaging portion;
one pressing surface of the pair of pressing surfaces is provided on one main body plate of the pair of main body plates;
the other pressing surface of the pair of pressing surfaces is provided on the other main body plate of the pair of main body plates;
the link member is arranged between the pair of main body plates, and has a first end portion pivotally connected to the pivot support shaft, and a second end portion pivotally connected to the input-side engaging portion; and
the engaging element is such that when a rotational torque is inputted to the input member, the pivot support shaft is pulled by the input-side engaging portion via the link member, so that the engaging element displaces so as to move away from the pressed surface, and by causing the output-side engaged portion to engage with the output-side engaging portion, transmits the rotational torque inputted to the input member to the output member, and when a rotational torque is reversely inputted to the output member, the pair of pressing surfaces are pressed against the pressed surface due to engagement of the output-side engaging portion and the output-side engaged portion, the pair of pressing surfaces frictionally engage with the pressed surface.

2. The reverse input blocking clutch according to claim 1, wherein
the engaging element main body has an insertion hole;
the input-side engaging portion is inserted into the insertion hole, and
there is a gap between the input-side engaging portion and the inner surface of the insertion hole allowing the input-side engaging portion to displace in a rotational direction of the input member with respect to the engaging element main body, and there is a gap allowing the engaging element main body to displace in the first direction with respect to the input-side engaging portion.

3. The reverse input blocking clutch according to claim 1, wherein
the engaging element main body includes an intermediate plate on both side portions in the section direction between of the pair of main body plates and sandwiched in the axial direction between the pair of main body plates;
the both sides in the axial direction of the pivot support shaft is supported by an intermediate portion in the second direction of the pair of main body plates; and
the link member is pivotally arranged in the intermediate portion in the second direction between the pair of main body plates.

4. The reverse input blocking clutch according to claim 1, wherein
a pair of the engaging elements are provided so as to sandwich the output-side engaging portion from both sides in the radial direction.

5. The reverse input blocking clutch according to claim 4, comprising
a spring that is arranged between the pair of engaging elements and elastically biases each of the pair of engaging elements in a direction toward the pressed surface.

6. The reverse input blocking clutch according to claim 1, wherein
the pair of main body plates have the same shape as each other.

* * * * *